(12) United States Patent
Feng et al.

(10) Patent No.: US 11,449,696 B2
(45) Date of Patent: *Sep. 20, 2022

(54) ALTERNATIVE ILLUMINATOR ASSEMBLY AND MOBILE IMAGING APPARATUS FOR IMPROVED DIRECT PART MARKING READING

(71) Applicant: Hand Held Products, Inc., Fort Mill, SC (US)

(72) Inventors: Chen Feng, Snohomish, WA (US); Tao Xian, Mount Laurel, NJ (US); Paul Poloniewicz, Waxhaw, NC (US); Scott Bracken, Lynwood, WA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,430

(22) Filed: May 10, 2021

(65) Prior Publication Data

US 2021/0264124 A1 Aug. 26, 2021

Related U.S. Application Data

(63) Continuation of application No. 16/781,550, filed on Feb. 4, 2020, now Pat. No. 11,036,944.

(51) Int. Cl.
*G06K 7/10* (2006.01)
*G06K 7/14* (2006.01)

(52) U.S. Cl.
CPC ..... *G06K 7/10722* (2013.01); *G06K 7/10732* (2013.01); *G06K 7/1413* (2013.01)

(58) Field of Classification Search
None
See application file for complete search history.

(56) References Cited

U.S. PATENT DOCUMENTS

| 10,055,627 B2 | 8/2018 | Feng et al. |
| 10,210,364 B1 | 2/2019 | Feng et al. |
| (Continued) | | |

OTHER PUBLICATIONS

Extended European search report dated Jul. 2, 2021 for EP Application No. 21155095, 8 pages.

(Continued)

*Primary Examiner* — Kristy A Haupt
(74) *Attorney, Agent, or Firm* — Alston & Bird LLP

(57) ABSTRACT

Embodiments of the present disclosure provide an alternative illuminator assembly and corresponding imaging assemblies utilizing the alternative illuminator assembly. The alternative illuminator assembly may provide alternative illuminations from those produced by an imager engine, such that the alternative illuminations may provide specific illuminations at specific illumination angles to illuminate a field of view for a desired purpose. In an example context, the alternative illuminator assembly provides one or more alternative illuminations for improving the likelihood of successfully reading specific direct part marking indicias of various types. Embodiments are provided using overlapping subassemblies that enable a small form factor assembly that can fit into mobile apparatus chasses, for example within conventional cell phone housings of around 7 millimeters. The alternative illuminator assembly may be provided together with a small form factor imaging engine, having one or more imager, to improve the direct part marking reading capabilities of the multi-sensor imaging apparatus.

20 Claims, 12 Drawing Sheets

(56) References Cited

U.S. PATENT DOCUMENTS

| | | | |
|---|---|---|---|
| 11,036,944 B1* | 6/2021 | Feng | ............... G06K 7/10722 |
| 2003/0029917 A1 | 2/2003 | Hennick et al. | |
| 2018/0101709 A1* | 4/2018 | Feng | ............... G06K 7/10881 |

OTHER PUBLICATIONS

Integrated Illumination-Aimer Imaging Apparatuses, U.S. Appl. No. 16/684,124, Feng, et al., filed Nov. 14, 2019.
Notice of Allowance and Fees Due (PTOL-85) dated Feb. 12, 2021 for U.S. Appl. No. 16/781,550.
U.S. Appl. No. 16/781,550, filed Feb. 4, 2020, now U.S. Pat. No. 11,036,944.

* cited by examiner

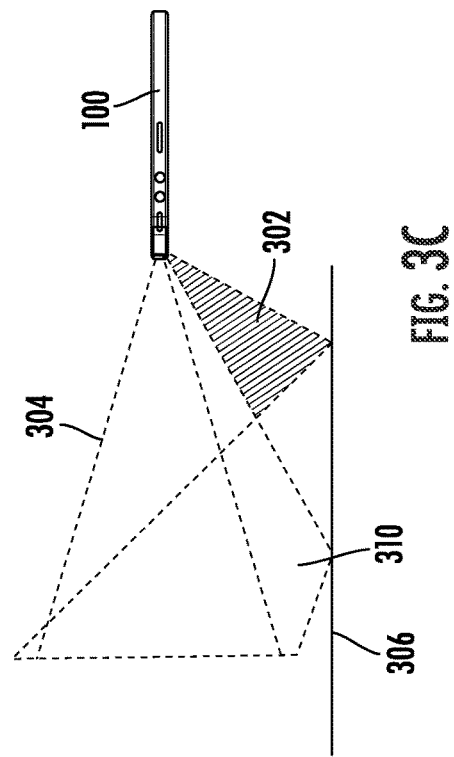
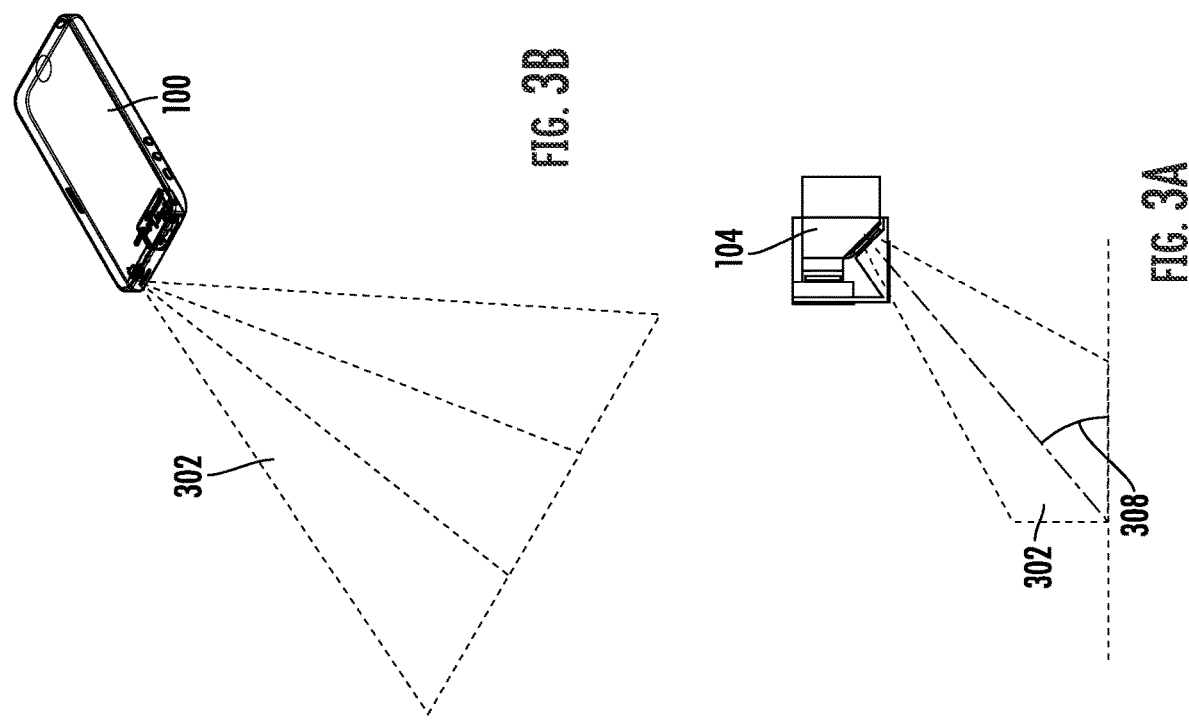
FIG. 3A
FIG. 3B
FIG. 3C

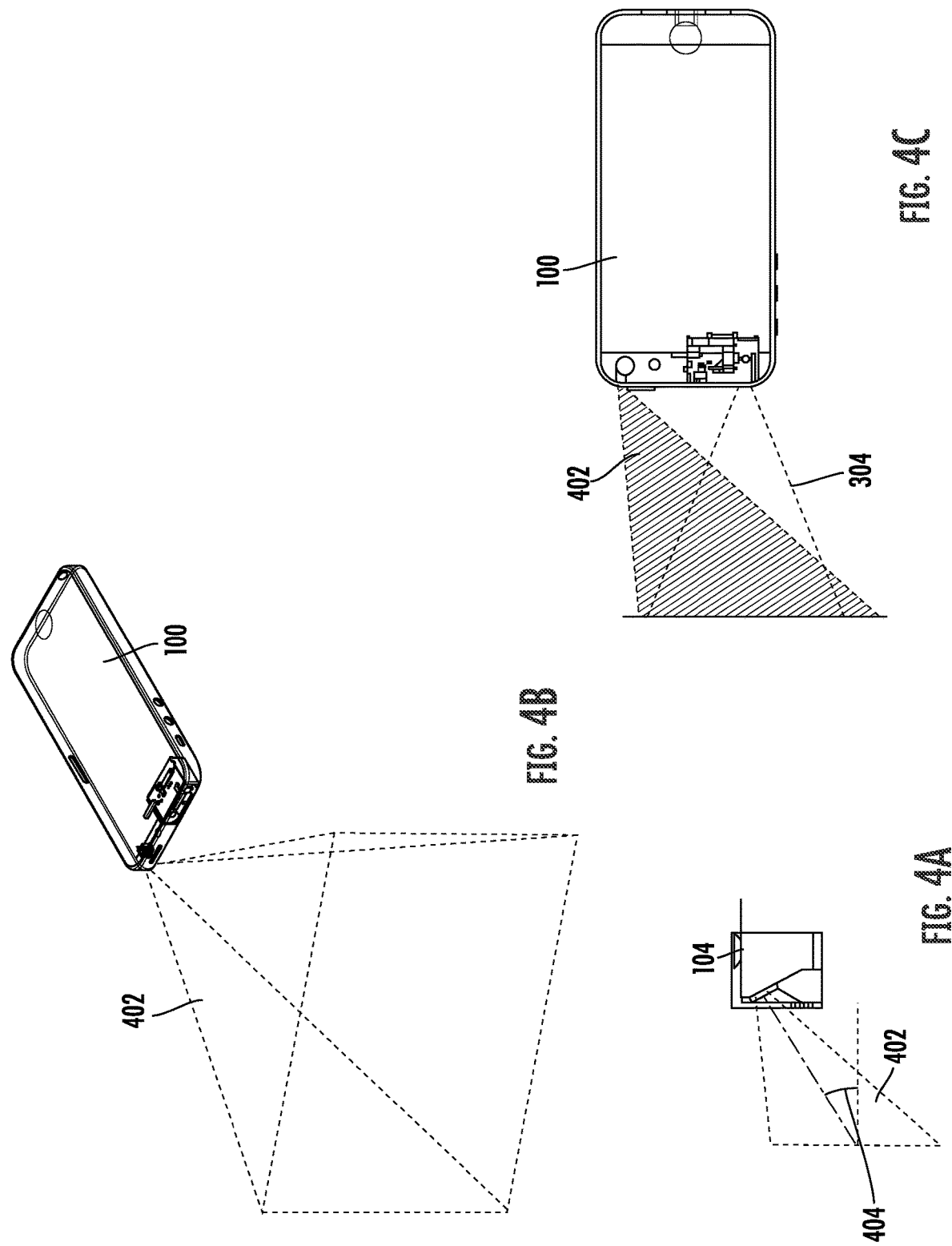

ALTERNATIVE ILLUMINATOR ASSEMBLY AND MOBILE IMAGING APPARATUS FOR IMPROVED DIRECT PART MARKING READING

CROSS-REFERENCE TO RELATED APPLICATIONS

This application is a continuation of and claims priority to U.S. Non-Provisional application Ser. No. 16/781,550, filed Feb. 4, 2020, the contents of which are incorporated herein by reference in their entirety.

TECHNOLOGICAL FIELD

Embodiments of the present disclosure generally relate to illuminator assemblies for imaging apparatuses, such as barcode and/or other symbology scanners, and specifically to illuminator assemblies for small form factor mobile imaging apparatuses for improved reading of various direct part marking indicia types.

BACKGROUND

Direct part marking often requires an imaging apparatus to be configured to read, such as by capturing and decoding, an encoded representation of data presented via any of a number of ways, surfaces, and/or the like. To provide specific illumination for certain types or readings, imaging apparatuses often utilize dome illuminator(s), for example for bright-field illumination, and/or ring illuminator(s), for example for dark-field illumination. Applicant has discovered problems with current implementations of imaging apparatuses for direct parts marking. Through applied effort, ingenuity, and innovation, Applicant has solved many of these identified problems by developing embodied in the present disclosure, which are described in detail below.

BRIEF SUMMARY

In general, embodiments of the present disclosure provided herein include alternative illuminator assemblies and alternative illuminator imaging apparatuses. Other implementations for one or more of the alternative illuminator assemblies and/or alternative illuminator imaging apparatuses will be, or will become, apparent to one with skill in the art upon examination of the following figures and detailed description. It is intended that all such additional implementations be included within this description be within the scope of the disclosure, and be protected by the following claims.

In accordance with one example aspect of the present disclosure, an alternative illuminator imaging apparatus is provided. In at least one embodiment of the present disclosure, an example alternative illuminator imaging apparatus comprises a mobile apparatus chassis comprising at least a terminal edge. The example alternative illuminator imaging apparatus further comprises an imaging engine, where the imaging engine is positioned within the apparatus chassis at a first location along the terminal edge. The example alternative illuminator imaging apparatus further comprises an alternative illuminator assembly configured for generating a first illumination at a first illumination angle and a second illumination at a second illumination angle, where the alternative illuminator assembly is located at a second location along the terminal edge.

In some embodiments of the example alternative illuminator imaging apparatus, the example alternative illuminator assembly further comprises a first support component to fixedly position the imaging engine within the mobile apparatus chassis, and a second support component to fixedly position the alternative illuminator assembly within the mobile apparatus chassis.

In some embodiments of the example alternative illuminator imaging apparatus, the alternative illuminator assembly comprises an illuminator lens surface comprising at least a first reflector and a first illumination lens, and a second reflector and a second illumination lens, where the illuminator lens surface comprises a first assembly securing opening; an illuminator component board comprising at least a first alternative illuminator source aligned with the first reflector and the first illumination lens, and comprising at least a second alternative illuminator source aligned with the second reflector and the second illumination lens, where the illuminator component board further comprises a second assembly securing opening; a heat sink positioned adjacent to disperse heat from the illuminator component board, where the heat sink comprises a third assembly securing opening; and an assembly securing component engaged with the first assembly securing opening, the second assembly securing opening, and the third assembly securing opening, to secure the illuminator lens surface, illuminator component board, and heat sink, where the first illuminator source, the first reflector, and the first illumination lens produces an illumination at a first illumination angle and wherein the second illuminator source, the second reflector, and the second illumination lens produce a second illumination at a second illumination angle, wherein the first illumination angle is greater than the second illumination angle. Additionally or alternatively, in at least some such embodiments of the example alternative illuminator imaging apparatus, the heat sink is of a predefined shape to, when engaged by the assembly securing component, align the first alternative illuminator source with the first reflector and align the second alternative illuminator source with the second reflector.

Additionally or alternatively, in some such embodiments of the example alternative illuminator imaging apparatus, activating the alternative illuminator assembly comprises activating a first alternative illuminator source of the alternative illuminator assembly, a second alternative illuminator source of the alternative illuminator assembly, or a combination thereof, and wherein activating the imaging engine comprises activating the first imager of the imaging engine, activating at least one illuminator source of the imaging engine, or a combination thereof.

Additionally or alternatively, in some such embodiments of the example alternative illuminator imaging apparatus, activating the imaging engine comprises alternating activating a first illuminator source of the imaging engine and activating a second illuminator source of the imaging engine.

In some embodiments of the example alternative illuminator imaging apparatus, the example alternative illuminator assembly further comprises at least one processor configured for activating the alternative illuminator assembly and activating the imaging engine.

In some embodiments of the example alternative illuminator imaging apparatus, the terminal edge comprises a chassis height of less than 7 millimeters.

In some embodiments of the example alternative illuminator imaging apparatus, the first location along the terminal edge is within a predefined distance from the second location along the terminal edge.

In some embodiments of the example alternative illuminator imaging apparatus, the first illumination comprises a uniform bounce flash illumination to enable reading of a highly reflective direct part marking indicia.

In some embodiments of the example alternative illuminator imaging apparatus, the second illumination comprises a dark-field illumination to enable reading of one or more from the group of a textured direct part marking indicia, a low contrast direct part marking indicia, and a non-contrast direct part marking indicia.

In some embodiments of the example alternative illuminator imaging apparatus, the alternative illuminator imaging apparatus is configured to produce a plurality of illuminations to enable reading of a plurality of direct part marking indicia types.

In accordance with yet another aspect of the present disclosure, an alternative illuminator assembly is provided. In at least one embodiment, an example alternative illuminator assembly comprises an illuminator lens surface comprising at least a first reflector and a first illumination lens, and a second reflector and a second illumination lens, where the illuminator lens surface comprises a first assembly securing opening. The example alternative illuminator assembly further comprises an illuminator component board comprising at least a first illuminator source aligned with the first reflector and the first illumination lens, and comprising at least a second illuminator source aligned with the second reflector and the second illumination lens, where the illuminator component board further comprises a second assembly securing opening. The example alternative illuminator assembly further comprises a heat sink positioned adjacent to disperse heat from the illuminator component board, where the heat sink comprises a third assembly securing opening. The example alternative illuminator assembly further comprises an assembly securing component engaged with the first assembly securing opening, the second assembly securing opening, and the third assembly securing opening, to secure the position of the illuminator lens surface, illuminator component board, and heat sink.

In some embodiments of the example alternative illuminator assembly, the first illuminator source comprises a first light emitting diode, and the second illuminator source comprises a second light emitting diode.

In some embodiments of the example alternative illuminator assembly, the illuminator component board comprises a printed circuit board.

In some embodiments of the example alternative illuminator assembly, the assembly securing component comprises an assembly securing screw.

In some embodiments of the example alternative illuminator assembly, the first illuminator source is aligned with the first reflector and the first illumination lens to produce light at a first illumination angle, and the second illuminator source is aligned with the second reflector and the second illumination lens to produce light at a second illumination angle.

In some embodiments of the example alternative illuminator assembly, the first illumination angle is greater than the second illumination angle.

In some embodiments of the example alternative illuminator assembly, the first illuminator source, the first reflector, and the first illumination lens produce a uniform bounce flash illumination associated with a first illumination angle to enable reading of a highly reflective direct part marking indicia.

In some embodiments of the example alternative illuminator assembly, the second illuminator source, the second reflector, and the second illumination lens produce a dark-field illumination associated with a second illumination angle to enable reading of one or more from the group of a textured direct part marking indicia, a low contrast direct part marking indicia, and a non-contrast direct part marking indicia.

BRIEF DESCRIPTION OF THE DRAWINGS

Figure 1:
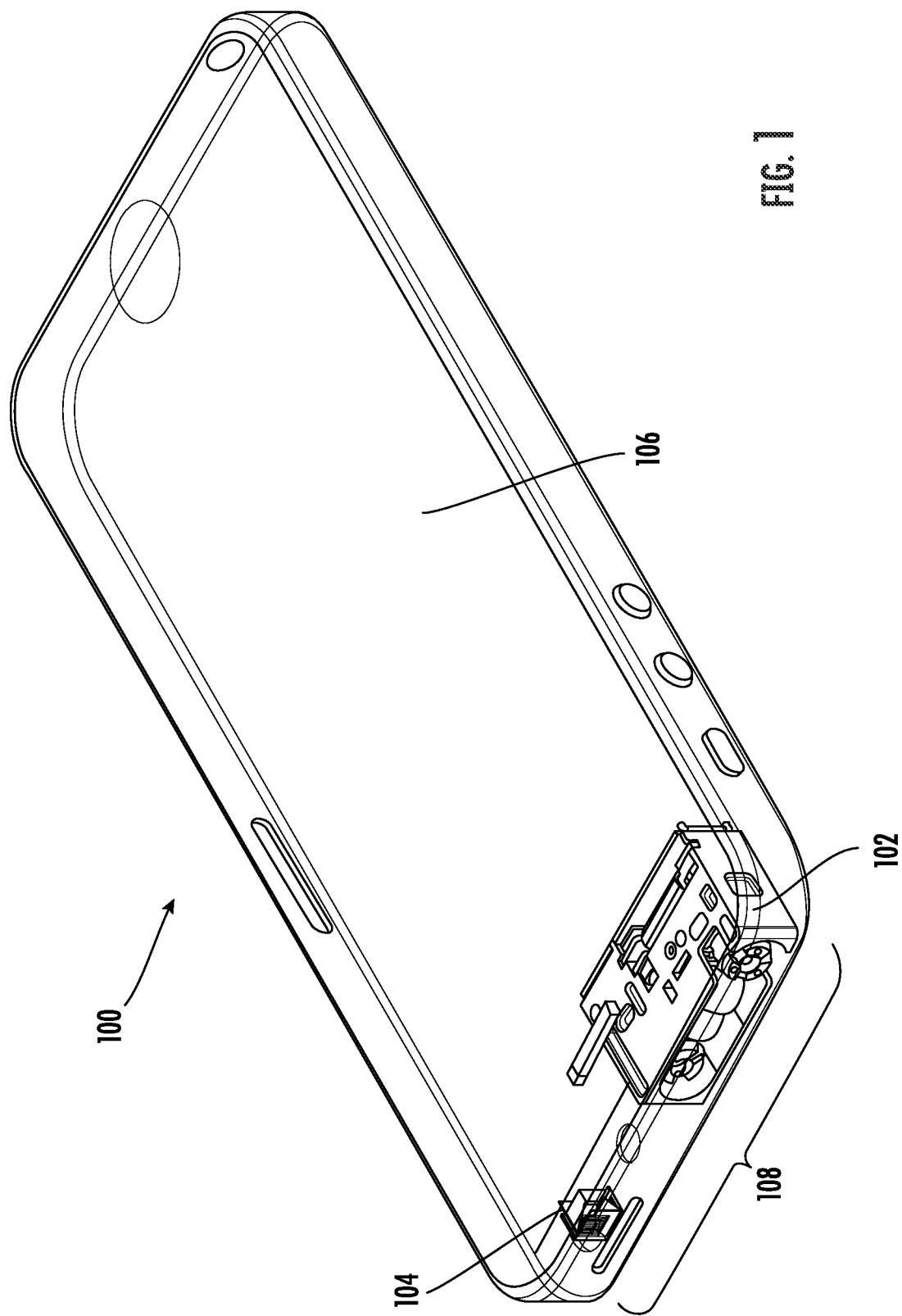
Figure 2:
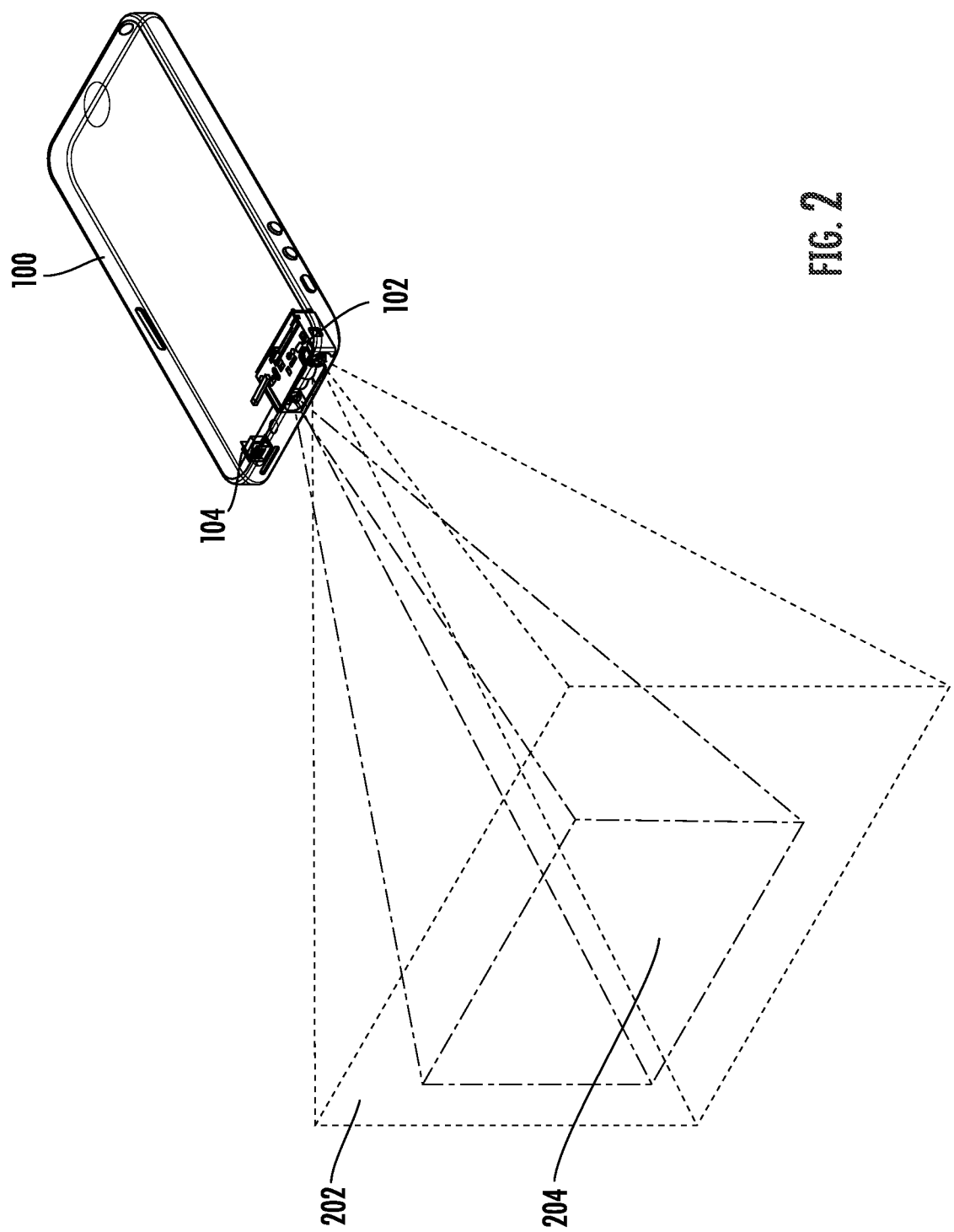
Figure 5A:
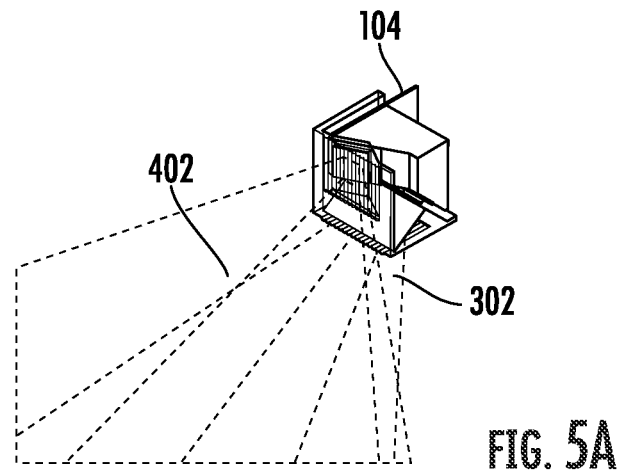
Figure 5B:
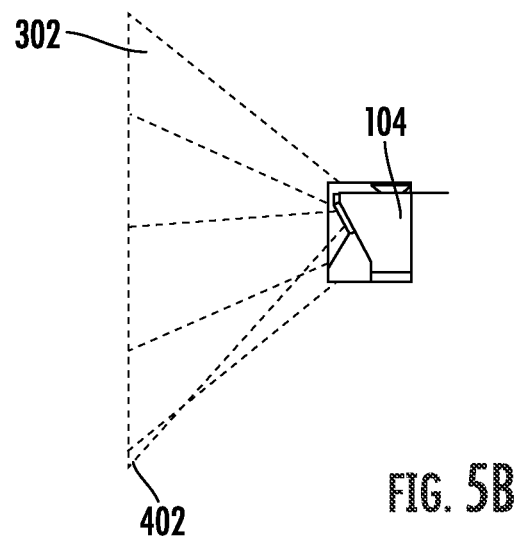
Figure 5C:
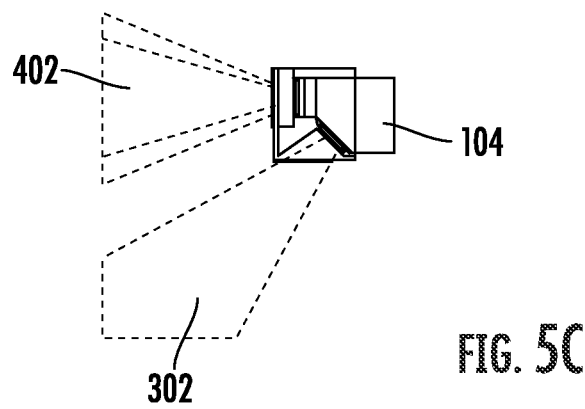
Figure 6A:
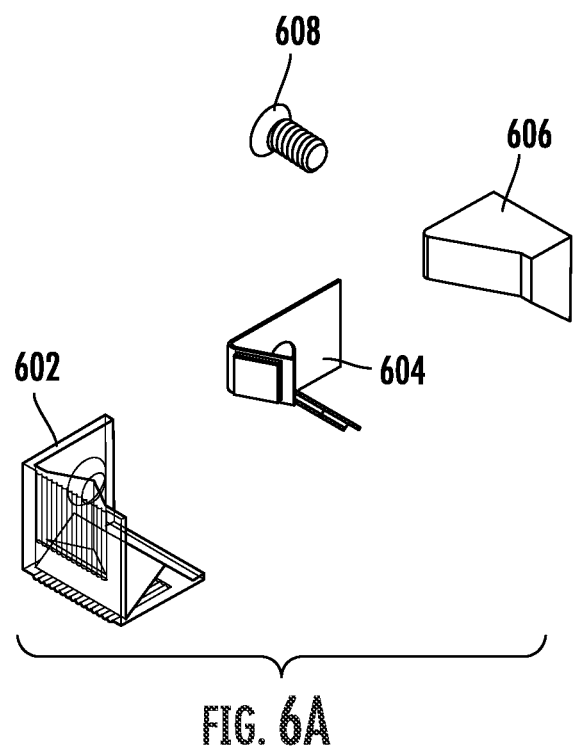
Figure 6B:
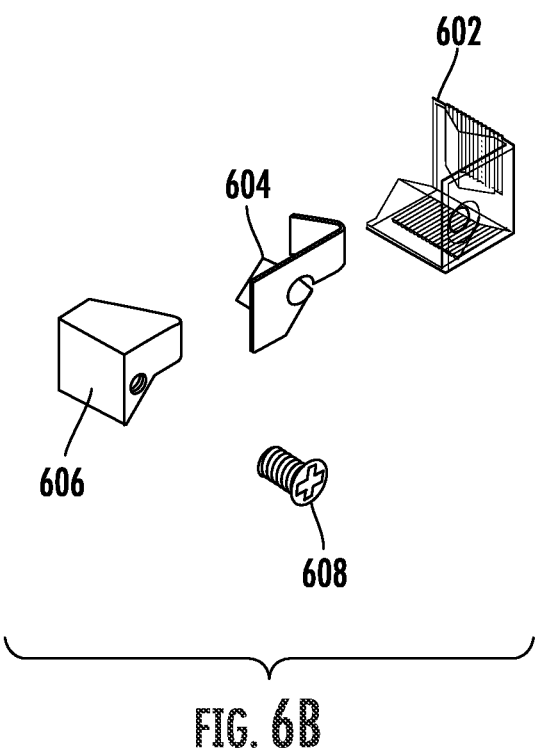
Figure 7A:
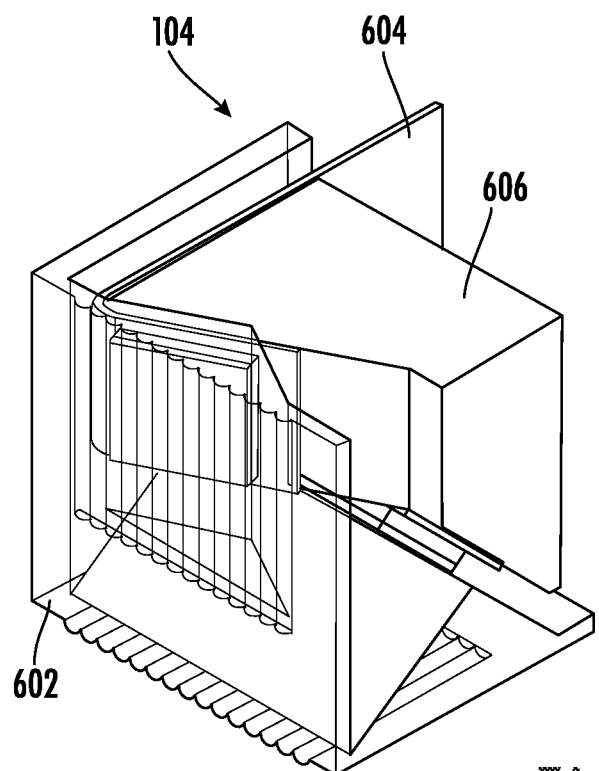
Figure 7B:
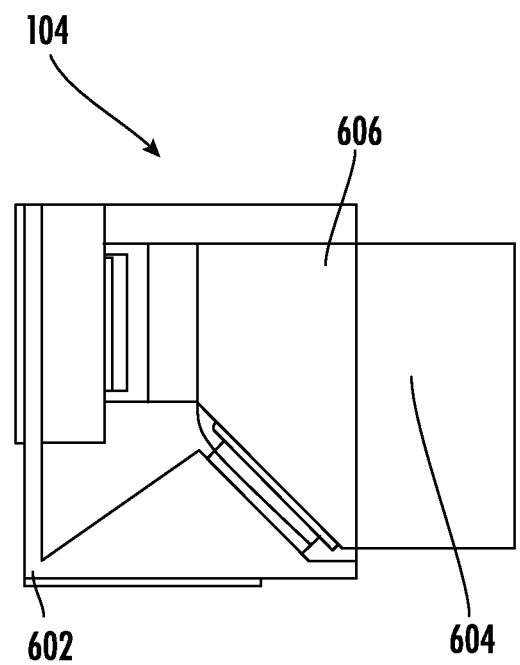
Figure 8A:
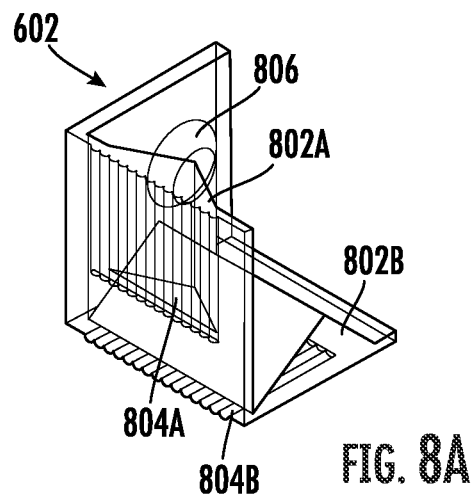
Figure 8B:
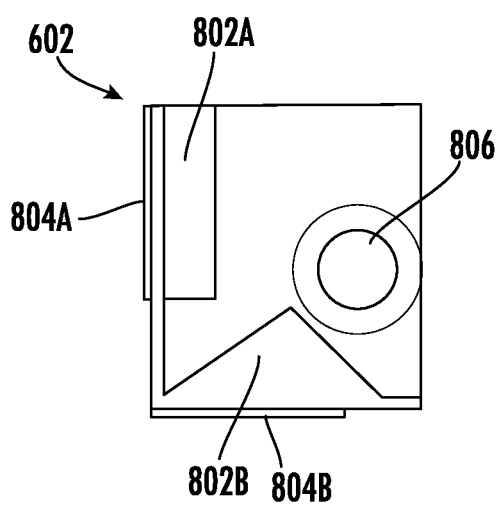
Figure 8C:
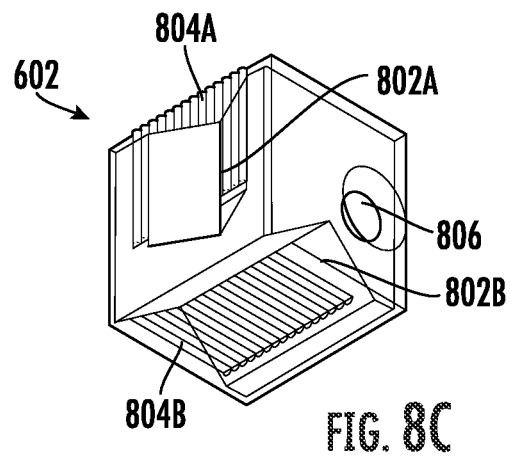
Figure 10A:
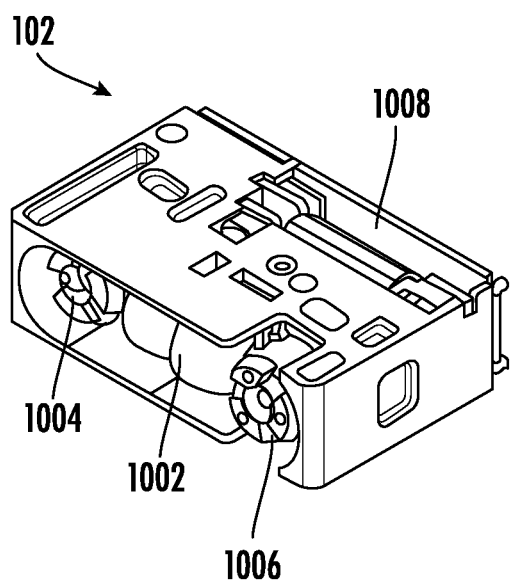
Figure 10B:
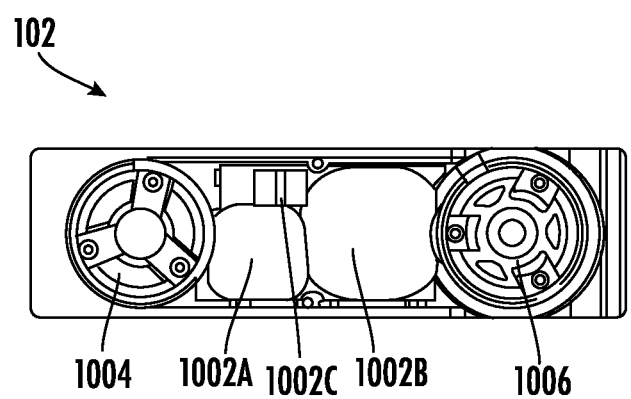
Figure 11:
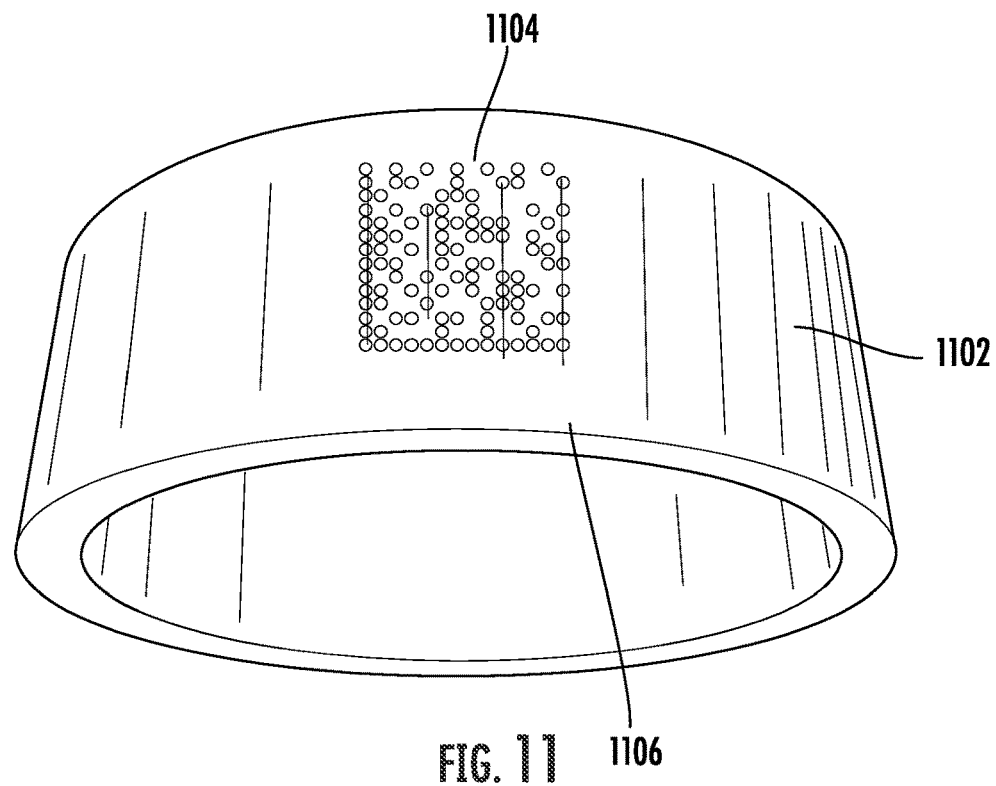
Figure 12:
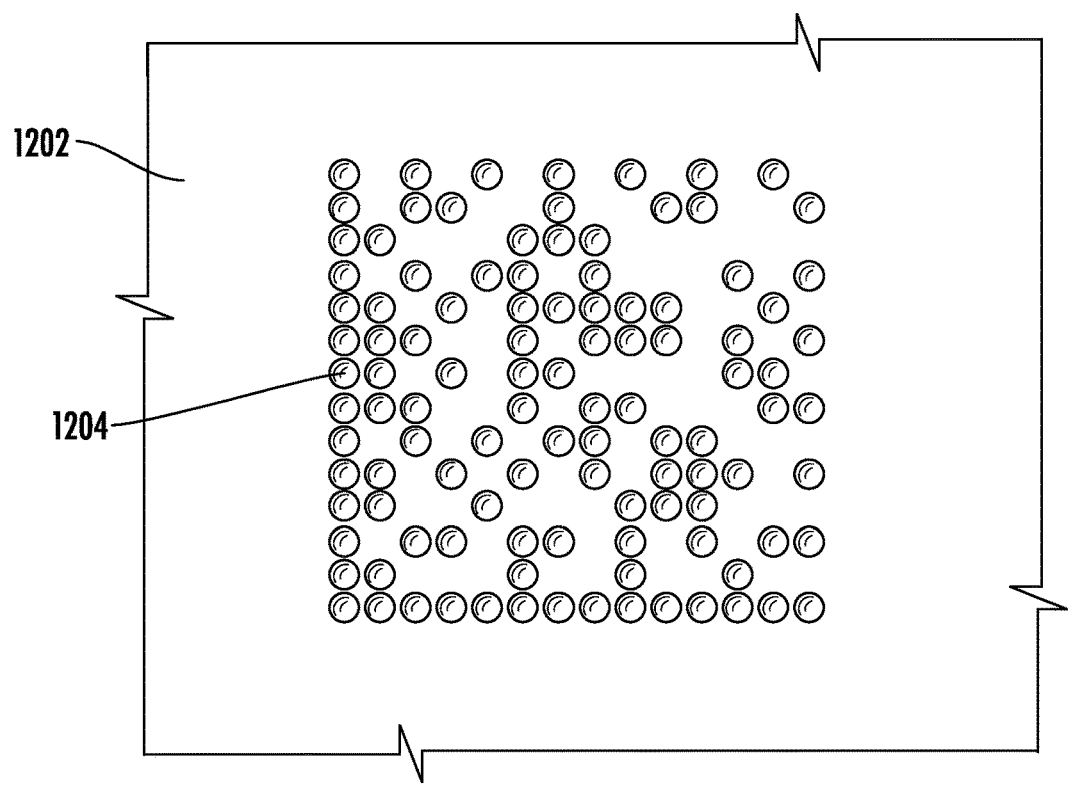

Having thus described the embodiments of the disclosure in general terms, reference now will be made to the accompanying drawings, which are not necessarily drawn to scale, and wherein:

FIG. 1 illustrates an example alternative illuminator imaging apparatus in accordance with at least one example embodiment of the present disclosure;

FIG. 2 illustrates an example visualization of a plurality of field of views captured utilizing an example alternative illuminator imaging apparatus, in accordance with at least one example embodiment of the present disclosure;

FIGS. 3A, 3B, and 3C illustrate various views of an example visualization depicting a first illumination produced by an alternative illuminator assembly, in accordance with at least one example embodiment of the present disclosure;

FIGS. 4A, 4B, and 4C illustrate various views of an example visualization depicting a second illumination produced by an alternative illuminator assembly, in accordance with at least one example embodiment of the present disclosure;

FIGS. 5A, 5B, and 5C illustrate various example visualizations of illuminations projected by an alternative illuminator assembly, in accordance with at least one example embodiment of the present disclosure;

FIGS. 6A and 6B illustrate exploded views of components of an alternative illuminator assembly, in accordance with at least one example embodiment of the present disclosure;

FIGS. 7A and 7B illustrate assembled components of an alternative illuminator assembly, in accordance with at least one example embodiment of the present disclosure;

FIGS. 8A-8C illustrate various views of various subcomponents of an example illuminator lens surface, in accordance with at least one example embodiment of the present disclosure;

FIGS. 9A-9E illustrate various views of various subcomponents of an example illuminator component board, in accordance with at least one example embodiment of the present disclosure;

FIGS. 10A and 10B illustrate various views of an example multi-sensor imaging engine, in accordance with at least one example embodiment of the present disclosure;

FIG. 11 illustrates a representation of a highly reflective direct part marking indicia affected by at least one specular reflection effect; and FIG. 12 illustrates a representation of a non-contrast direct part marking indicia illuminated by at least one illumination of an alternative illuminator assembly, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

An imaging apparatus is configured to capture one or more image data objects for the purposes of decoding the captured data to perform one or more image processing tasks. For example, in one example context, an imaging apparatus is configured to process captured image data object(s) to attempt to identify and/or decode visual indicia within the captured data. One such example context of image processing includes direct part marking reading. In direct parts marking reading, an imaging apparatus captures an image data object including a direct part marking indicia imprinted, etched, and/or otherwise rendered on an outer surface of an object. The direct part marking indicia may be represented in any of a myriad of ways based on a direct part marking methodology used to create the direct part marking indicia. For example, the direct part marking indicia may be rendered on the surface of the object, etched into the object or otherwise physically impacting a surface of the object to represent the direct part marking indicia, and/or the like.

In attempts to improve the quality of image data objects captured for processing, an imaging apparatus often includes or is associated with one or more illuminator sources. Each illuminator source produces an illumination onto a field of view to be captured by the imaging apparatus, for example to illuminate the field of view and enable capture of the direct part marking indicia based on light reflected from the produced illumination. However, not all illuminator sources effectively illuminate various direct part marking indicias. For example, various different direct part marking indicia types may be illuminated differently based on the same illumination. In one example context, a highly reflective direct part marking indicia may be affected by one or more specular reflection effects in a circumstance where an illumination is produced from certain angles, for example where the illuminator source and the object are in line with one another. In this regard, the image data object captured by imaging apparatus may include the specular reflection effects and causing improper reading of a direct part marking indicia or causing the reading to fail. Similarly, in another example context, a low-contrast and/or non-contrast direct part marking indicia may be illuminated in a manner that results in a captured image data object that is unlikely or impossible to successfully process. In an example circumstance where an illumination is produced from certain angles, for example where the illuminator source and the object including the direct part marking indicia are in line with one another, a captured image data object including a low-contrast and/or non-contrast direct part marking indicia may not include sufficient data differentiating the values represented within the direct part marking indicia.

To provide illumination for certain direct part marking indicia types, such as the highly reflective direct part marking indicia, low-contrast direct part marking indicia, and/or non-contrast direct part marking indicia described above, traditional implementations often utilize one or more additional ring illuminator(s) and/or dome illuminator(s). For example, in an example context a ring illuminator may be used to provide sufficient dark-field illumination to illuminate a low-contrast and/or non-contrast direct part marking indicia in a manner such that the image data object captured by an imaging apparatus includes data sufficient for successfully processing the direct part marking indicia. Further, in an example context, a dome illuminator may be used to provide sufficient bright-field illumination to illuminate a highly reflective direct part marking indicia with reduced, or eliminated, specular reflection effect(s), such that the image data object(s) captured by an imaging apparatus includes data sufficient to successfully process the direct part marking indicia. However, such conventional illuminator components are bulky and cannot be fit within a small form factor. For example, in this regard, such implementations are often impossible or otherwise unsuitable for use in mobile imaging apparatuses, for example mobile imaging apparatuses having a small form factor such as fitting into a cell phone apparatus chassis.

Accordingly, embodiments of the present disclosure provider alternative illuminator assemblies and corresponding mobile imaging apparatuses utilizing at least an alternative illuminator assembly. The alternative illuminator assembly may produce any number of illuminations, for example at least a dark-field illumination and a uniform bounce flash illumination, each specifically designed to appropriately illuminate direct part marking indicia of specific direct part marking indicia types. The alternative illuminator assembly may include a number of subassemblies designed to overlap so as to form a sufficiently small form factor assembly such that the alternative illuminator assembly may fit within small form factor mobile apparatus chasses. For example, the alternative illuminator assembly may be designed to fit within a traditional cell phone apparatus chassis of 6.8-7.2 millimeters. In this regard, the alternative illuminator assembly provides additional illumination in a plurality of contexts, and may be used in smaller environments whereas conventional illuminator assemblies would not fit. Additionally, embodiments described herein utilize a compact, lightweight, and simplified structure, decreasing the complexity of the assembly compared to conventional illuminator assemblies. Additionally, embodiment alternative illuminator assemblies described herein utilize fewer illuminator sources than conventional illuminator assemblies such as ring illuminators and/or dome illuminators, thus lowering power consumption as compared to conventional illuminator assemblies. Further, embodiment alternative illuminator assemblies described herein utilize a decreased component count as compared to conventional illuminator assemblies, thus lowering overall unit cost and enabling an easier assembly process.

The small form factor of the alternative illuminator assembly enables use in small form factor mobile imaging apparatuses. For example, an alternative illuminator assembly may be associated with a small form factor imaging engine that is configured to provide additional illumination and/or capture image data objects representing one or more field of views. In this regard, the alternative illuminator assembly may be provided in a small form factor apparatus chassis, such as a cell phone apparatus chassis, together with the small form factor imaging engine. Additionally, in some embodiments, the alternative illuminator assembly may be positioned separately from the imaging engine to enable illumination from illumination angles that differ from those of the illuminator sources integrated with and/or otherwise within the imaging apparatus. In this regard, the alternative illuminator assembly may provide one or more illuminations for illuminating one or more field of views from alternative illumination angles as compared to the illuminators of the imaging engine. In this regard, the alternative illuminator imaging apparatus may improve the likelihood of capturing image data objects that may be successfully decoded for any of a plurality of direct part marking indicia types, even in circumstances in which the imaging apparatus is required to maintain a small form factor.

Definitions

The term "illuminator source" refers to one or more light generating components configured to produce light for projecting through corresponding projection optics. In some embodiments, one or more subassemblies includes a plurality of illuminator sources, each associated with a different light intensity level, projection optics, and/or the like. Non-limiting examples of an illuminator source include a light emitting diode ("LED"), laser diode, and/or a combination thereof. The term "alternative illuminator source" refers to an illuminator source within an alternative illuminator assembly.

The term "image capture optics" refers to one or more lenses and/or corresponding enclosures defining an aperture to receive reflected light. In some embodiments, image capture optics Each image capture optics is associated with an image sensor, such that the image capture optics combined with the image sensor defines a field of view captured utilizing such components. It should be appreciated that image capture optics may include one or more lenses constructed of any of a number of materials, including, without limitation, a 3-glass lens, a 3-plastic lens, or the like.

The term "illumination lens" refers to projection optics comprising one or more lenses and/or corresponding enclosures configured to receive light produced by an illuminator source and produce an illumination of a predefined illumination pattern from received light. In at least one example context, one or more physical properties of the illumination lens defines the illumination pattern associated with the projection optics, for example based on a defined shape and/or curvature of the projection optics. In some embodiments, the illumination lens receives light reflected from an associated reflector. In some embodiments, an illumination lens comprises a lens array of a defined size.

The term "image sensor" refers to one or more electrical component(s) configured to capture light interacting with the electrical component(s) to produce an image data object based on the captured light. In some embodiments, an image sensor is associated with an active-pixel resolution that defines an image size for the produced image data object. Non-limiting examples of an image sensor include the AR0234 global shutter monochrome sensor (1920×1200 resolution, 3 um pixel), and a non-limiting example of a far-field imaging sensor 112B includes the AR0144 global shutter monochrome sensor (1280×800 resolution, 3 um pixel), each manufactured by ON Semiconductor® headquartered in Phoenix, Ariz.

The term "illumination" refers to light produced by an illuminator source. In some embodiments, an illumination is associated with a particular illumination pattern that defines the intensity of light produced at each point within a particular field upon which the illumination is projected.

The term "illumination angle" refers to an angle of incidence at which an illumination is produced with respect to a predefined axis. In some embodiments, the illumination angle refers specifically to the angle of incidence between the predefined axis and a central axis of the produced illumination.

The term "uniform bounce flash illumination" refers to an illumination at an upward and/or downward illumination angle with respect to a reference axis normal to one or more image sensors defining a field of view to be captured by the image sensors, where the illumination is provided towards a surface to reflect the illumination upon the field of view at a reflected angle. For example, in at least one example context a uniform bounce flash illumination is provided at a downward angle to reflect, off of a table, floor, supporting object, and/or other surface, into a field of view at an upward angle. In some embodiments, a uniform bounce flash illumination is produced at above a minimum uniform bounce flash illumination angle.

The term "dark-field illumination" refers to an illumination at an illumination angle with respect to a reference axis normal to a field of view for an imager. For example, in at least one example context, a dark-field illumination is produced from above the field of view a downward illumination angle. In some embodiments, a dark-field illumination is produced at above a minimum dark-field illumination angle.

The term "mobile apparatus chassis" refers to a housing for one or more subassemblies to form an apparatus, where the housing is of a sufficiently small form factor to enable handheld and/or unassisted movement of the apparatus by an operator. In some embodiments, the mobile apparatus chassis defines a component space for fitting subassemblies therein, the component space defined by at least one length, width, and height. In some example contexts, the component space is restricted by a smallest dimension in at least one direction, for example by a height of the apparatus chassis. A non-limiting example of a mobile apparatus chassis comprises a cell phone chassis limited by a height dimension.

The term "terminal edge" refers to an edge of an apparatus chassis where at least one outward facing subassemblies are located. In an example context of an apparatus chassis for an imaging apparatus, the terminal edge includes at least one subassemblies including one or more illuminator sources, for example a multi-sensor imaging engine and an alternative illuminator assembly as described herein.

The term "support component" refers to one or more physical structures for aligning and/or positioning a component to a housing for the component. Non-limiting examples of a support component include one or more physically-defined spaces, protrusions, adhesives, screws, snaps, and/or the like.

The term "multi-sensor imaging engine" refers to an apparatus including a plurality of image sensors configured to enable capturing of image data objects associated with various focus ranges and/or field of views. Additionally or alternatively, in some embodiments, the multi-sensor imaging engine additionally includes a plurality of illuminator sources, each illuminator source associated with one or more image sensor(s). In at least one example context, the multi-sensor imaging engine is comprises at least a far-field imager and a near-field imager, where an imager includes a sensor, illuminator source, and image capture optics defining a field of view. One example multi-sensor imaging engine includes the integrated illumination-aimer apparatuses, and/or subassemblies thereof, described in U.S. Non-provisional application Ser. No. 16/684,124 titled "INTEGRATED ILLUMINATION-AIMER IMAGING APPARATUSES," filed Nov. 14, 2019, the contents of which is incorporated herein by reference in its entirety.

The term "alternative illuminator assembly" refers to an apparatus located within an imaging apparatus and separate from one or more associated single-sensor and/or multi-sensor imaging engine subassemblies, where the apparatus is configured to produce at least one or more alternative illuminations. In some embodiments, the alternative illuminator assembly is configured to produce a first illumination at a first incidence angle and a second illumination at a second incidence angle. In some example contexts, the first incidence angle is greater than the second incidence angle, for example where the first illumination enables dark-field illumination and where the second illumination enables bounce-flash illumination.

The term "illuminator lens surface" refers to a subcomponent of an alternative illuminator assembly including at least one illumination lens and at least one reflector. In at least one example context, each reflector of an illumination lens surface is associated with a corresponding illuminator lens to produce an illumination from incoming light, for example from an associated illuminator source. Additionally or alternatively, in some embodiments, the illuminator lens surface functions as a housing for the alternative illuminator assembly.

The term "reflector" refers to a subassembly of an illuminator lens surface including one or more optical components to reflect incoming light towards an illumination lens. In some embodiments, a reflector comprises a triangular prism reflector designed to reflect incoming light at a predetermined angle.

The term "assembly securing opening" refers to an opening in an apparatus, and/or component thereof, designed to receive an assembly securing component to align and/or position the subassembly in relation to one or more associated subassemblies and/or components for operation. In some embodiments, a plurality of subcomponents for a given apparatus each include one or more assembly securing opening(s), such that when the assembly securing opening(s) are aligned, each subcomponent is appropriately positioned and/or aligned for operation of the assembly.

The term "illuminator component board" refers to a component configured to enable positioning, alignment, and operation of one or more illuminator sources. In some embodiments, the illuminator component board is designed of a predefined shape to align with one or more other components of an apparatus, for example for alignment with a heat sink and/or reflectors of an illuminator lens surface in an alternative illuminator subassembly. In some embodiments, the illuminator component board comprises a printed circuit board with one or more illuminator sources fixedly attached to the printed circuit board to enable activation of the one or more illuminators. In one or more embodiments, the illuminator component board is connected to one or more processors and/or other operational circuitry of an imaging apparatus and/or associated apparatus embodying a subassembly of the imaging apparatus.

The term "heat sink" refers to a component configured to transfer heat generated by one or more subcomponents of an apparatus and/or dissipate the heat of the subcomponent. In this regard, it should be appreciated that a heat sink enables regulation and/or reduction in overall heat generated by one or more components of an apparatus. In some example contexts, a heat sink is provided in an alternative illuminator assembly to reduce and/or otherwise regulate heat generated by one or more illuminator sources therein. It should be appreciated that non-limiting example heat sinks include active heat sinks and passive heat sinks.

The term "assembly securing component" refers to one or more devices, hardware, or subassembly configured to engage the assembly securing opening for one or more components of an apparatus to align and/or position the components of the apparatus for operation. Additionally or alternatively, in some embodiments, the assembly securing component enables locking the subcomponents of the apparatus in an aligned position. Non-limiting examples of an assembly securing component include a screw, pin, and slidable securing mechanism. For example, the term "assembly securing screw" refers to a screw designed to engage the assembly securing opening of an illuminator lens surface, illuminator component board, and heat sink, within an alternative illuminator assembly in desired alignments and/or positions.

The term "direct parts marking indicia" refers to a visual representation of text, symbology, and/or other decodable information with which an object, such as a part, apparatus, component, and/or the like, is permanently marked using a direct part marking methodology. Non-limiting examples of a direct part marking methodology includes embossing, electrochemical etching, laser marking, engraving, part cutting (for example via a mechanical and/or laser cut), and/or the like. In some embodiments, an object is marked via a physical process, chemical process, and/or a combination thereof. Non-limiting examples of direct parts marking indicias include direct part marked Quick Response Code, 2-Dimensional Barcode, 1-Dimensional Barcode, and Data Matrix.

The term "direct parts marking indicia type" refers to a categorization associated with a direct part marking indicia based on one or more of the direct part marking methodology utilized to create the direct part marking indicia and/or one or more visual properties associated with the direct part marking indicia. Non-limiting examples of a direct part marking indicia type includes a "highly reflective direct part marking indicia," which refers to a direct part marking indicia having specular reflective properties above a predetermined threshold, a "low contrast direct part marking indicia," which refers to a direct part marking indicia having one or more data values represented using at least a first color and a second color where the difference between the first color and the second color is below a predetermined color difference threshold, and a "non-contrast direct part marking indicia," which refers to a direct part marking indicia having one or more data values represented using the same color and differentiated using another physical and/or visual property (for example, by indenting an area to represent a first value and not indenting an area to represent a second value).

Example Alternative Illuminator Imaging Apparatus

FIG. 1 illustrates one such example embodiment of an alternative illuminator imaging apparatus. In this regard, FIG. 1 depicts alternative illuminator imaging apparatus 100. The alternative illuminator imaging apparatus 100 comprises a mobile apparatus chassis 106. The mobile apparatus chassis functions as a housing for the various components of the alternative illuminator imaging apparatus 100, and/or other hardware components associated therewith. As illustrated, for example, the mobile apparatus chassis embodies a cell phone apparatus chassis. The cell phone apparatus chassis is associated with a chassis height, a chassis width, and a chassis length. As illustrated, the cell phone apparatus chassis is restricted based on the apparatus height, which is substantially smaller than the chassis length and chassis width. For example, in at least one example embodiment, the chassis height may be 7 millimeters or approximately 7 millimeters, for example 6.8 mm-7.2 mm as is common for many cell phone apparatus chasses. In some embodiments, for example as illustrated, the mobile apparatus chassis 106 is restricted based on one or more dimensions associated with a terminal edge of the mobile apparatus chassis 106, for example the chassis height of the terminal edge 108.

The mobile apparatus chassis 106 embodied by a cell phone apparatus chassis comprises a terminal edge 108. A terminal edge may represent a face, of the mobile apparatus chassis 106 along which one or more assemblies associated with image capture are located. For example, as illustrated, the terminal edge 108 is located at the top of the mobile apparatus chassis 106. In this regard, the terminal edge of the mobile apparatus chassis 106 may include one or more opening(s) and/or protective window(s) enabling light to flow in and out of the mobile apparatus chassis 106, for example to and/or from the components therein. It should be appreciated that, in other embodiments, the terminal edge may be located on another face of the mobile apparatus chassis 106, for example a bottom face, either side face, a front face, and/or a back face.

The alternative illuminator imaging apparatus 100 as illustrated further comprises two components. In this regard, the alternative illuminator imaging apparatus 100 comprises the alternative illuminator assembly 104. The alternative illuminator assembly 104 may be embodied in any of a myriad of ways, for example as depicted and described below with respect to FIGS. 6A, 6B, 7A, and 7B. The alternative illuminator imaging apparatus 100 additionally comprises the multi-sensor imaging engine 102. The multi-sensor imaging engine 102 may be embodied in any of a myriad of ways, for example as depicted and described below with respect to FIGS. 10A and 10B.

As illustrated, each of the alternative illuminator assembly 104 and multi-sensor imaging engine 102 include one or more outward-facing components along the terminal edge 108 of the mobile apparatus chassis 106. In this regard, the terminal edge 108 may provide one or more openings to enable light to pass into and/or out of each of the components, and/or one or more protective windows to protect such components while also enabling light to pass into and/or out of each of the components 102 and/or 104. For example, the terminal edge 108 may include one or more openings with a protective window in front of the alternative illuminator assembly 104 to enable light produced by one or more illumination sources of the alternative illuminator assembly 104 to pass through and illuminate a corresponding field of view. Additionally or alternatively, the terminal edge 108 may include one or more openings with a protective window in front of the multi-sensor imaging engine 102 to enable light produced by one or more illumination sources of the multi-sensor imaging engine 102 to pass through and illuminate a corresponding field of view, and/or light to enter one or more optical components of the multi-sensor imaging engine 102 for capture by one or more image sensors, for example to enable one or more image sensors to each capture an image data object representing a field of view.

The alternative illuminator assembly 104 and multi-sensor imaging engine 102 may be located at any number of locations along the terminal edge 108. For example, in this regard, the alternative illuminator assembly 104 may be located at a first location along the terminal edge 108, and the multi-sensor imaging engine 102 may be located at a second location along the terminal edge 108. The first location and the second location may be separated by a particular distance, for example based on one or more properties and/or configurations associated with the alternative illuminator assembly 104 and/or multi-sensor imaging engine 102. For example, in at least one example context, the distance is based at least on the dimensions for the multi-sensor imaging engine and the dimensions for the alternative illuminator, where the width of each component defines a minimum distance. In some contexts, it is desirable to increase the distance between the first location and the second location, and/or the illumination angle of one or more illuminator source(s) of the alternative illuminator assembly 104, for example to improve the dark-field illumination of a field of view captured by the multi-sensor imaging engine 102. In some example contexts, the distance is constrained by the length of the terminal edge 108. In this regard, in at least one example embodiment, the alternative illuminator 104 is located nearest a location along the terminal edge 108 where the terminal edge 108 ends, adjoins with a second face of the apparatus chassis 106, and/or substantially curves to begin new face of the apparatus chassis 106 (e.g., a "corner" of the apparatus chassis 106). In some example embodiments, the separation distance between the first location for the alternative illuminator assembly 104 and the multi-sensor imaging engine 102 comprises 50-60 mm.

In some embodiments, the alternative illuminator imaging apparatus 100 includes one or more support components for positioning the alternative illuminator assembly 104 and/or multi-sensor imaging engine 102. For example, in some embodiments, the apparatus chassis 106 comprises one or more components designed to engage the alternative illuminator assembly 104 and/or multi-sensor imaging engine 102, such as defining a particular area to house the component(s) in place, enable the component(s) to "snap" into place, and/or one or more screws, mounts, and/or other physical supports for fixedly connecting the component(s) to the apparatus chassis 106. Alternatively or additionally, in some embodiments, one or more of the alternative illuminator assembly 104 and/or multi-sensor imaging engine 102 are positioned utilizing one or more adhesives, chassis melding, and/or other position securing methodologies without any additional physical component(s).

In this regard, the sufficiently small form factor associated with the alternative illuminator assembly 104 provides for use within small form factor environments. For example, whereas conventional illuminator components may be too large to fit within a mobile apparatus chassis 106, such as a cell phone apparatus chassis restricted based on a limited chassis height, the alternative illuminator assembly 104 may be fit within the mobile apparatus chassis 106 without difficulty. Accordingly, the alternative illuminator assembly 104 may be utilized within a small form factor mobile imaging apparatus, such as the alternative illuminator imaging apparatus 100, while retaining the small form factor and without sacrificing functionality associated with additional illuminators for specific direct part marking indicia types.

It should be appreciated that an imaging apparatus may include any type of imaging engine, for example an imaging engine including any number of imager(s) and/or illuminators. For example, in some example embodiments, the imaging apparatus may include a single-sensor imaging engine including a single imager, and/or a single illuminator source associated with the imager. Alternatively, in some other example embodiments, the imaging apparatus may include a dual-sensor imaging engine including a near-field imager and a far-field imager, and/or a far-field illuminator source and a near-field illuminator source. In at least some other embodiments, the imaging apparatus may include a dual-sensor imaging engine including a near-field imager and a far-field imager, and a single illuminator source. In yet some other embodiments, the imaging apparatus may include more than two imagers, more than two illuminator sources, or another combination of imagers and illuminator sources (e.g., two imagers, but no illuminators, and rely solely on the alternative illuminator assembly 104). In this regard, the scope and spirit of the disclosure is not limited to usage of a particular imaging engine, such as a single-sensor, dual-sensor, or multi-sensor imaging engine.

FIG. 2 illustrates an example visualization of a plurality of field of views captured utilizing the alternative illuminator imaging apparatus 100. Specifically, as illustrated, FIG. 2 includes a near field of view 202 and a far field of view 204. The far field of view 202 may embody a narrower field of view than the near field of view 202, such that the far field of view 202 may be referred to as a "narrow field of view" and the near field of view 204 may be referred to as a "broad field of view." In this regard, the near field of view 202 may encompass some or all of the far field of view 204 when the alternative illuminator imaging apparatus 100 is located at a threshold distance from the field to captured.

In some embodiments, each of the field of views 202 and 204 is captured and represented as image data objects, for example using one or more components of the alternative illuminator imaging apparatus 100 and/or subcomponents thereof. As illustrated, for example, the field of views 202 and 204 may be captured using the multi-sensor imaging engine 102. The multi-sensor imaging engine 102 may include a near-field imager comprising at least field capture optics that define the near field of view 202 and a corresponding near-field image sensor to capture the near field of view 202. Additionally or alternatively, the multi-sensor imaging engine 102 may include a far-field imager comprising at least field capture optics that define the far field of view 204 and a corresponding far-field image sensor to capture the far field of view 204. Additional description with respect to such subcomponents of the multi-sensor imaging engine 102 is provided below with respect to FIGS. 10A and 10B.

To capture an image data object including sufficient data for successful processing, for example to detect and decode a direct part marking indicia represented within the captured image data object, the field of views 202 and 204 may be illuminated utilizing one or more of the subcomponents of the alternative illuminator imaging apparatus 100. For example, the multi-sensor imaging engine 102 may provide one or a plurality of illuminations of the field of views 202 and 204. Such illuminations may be sufficient to enable capture of image data objects having sufficient data such that direct part marking indicias of represented within can be successfully detected and/or decoded. However, due to the limitations of the proximity between the illuminator sources of the multi-sensor imaging engine 102 and the associated imagers for capturing the image data objects, the illuminations provided by the illuminator sources of the multi-sensor imaging engine 102 may be forced to be at an illumination angle normal, or substantially normal within a small deviation, to the image sensors defining the field of views 202 and 204. Such illumination may provide improper illumination to the field of views 202 and/or 204 for certain direct part marking indicia types, such that the resulting captured image data objects do not include sufficient data to enable the successful detecting and/or decoding of a direct part marking indicia represented within the captured image data object. For example, in a circumstance where a direct part marking indicia is a highly reflective direct part marking indicia, a textured direct part marking indicia or other non-contrast direct part marking indicia, and/or a low contrast direct part marking indicia, such illumination may be insufficient to enable capture of successfully detectable and/or decodable image data objects. Accordingly, the alternative illuminator assembly 104 may provide one or more illuminations that appropriately illuminate one or more of the near field of view 202 and/or far field of view 204 for purposes of capturing image data objects representing a direct part marking indicia, of such direct part marking indicia types, such that the image data object(s) include requisite data for successful detection of the direct part marking indicia and/or decoding of the direct part marking indicia. Examples of such illuminations produced by the alternative illuminator assembly 104 are described below with respect to FIGS. 3A-3C, 4A-4C, and 5A-5C.

It should be appreciated that, to function properly and/or improve the likelihood of successful scanning operations, the alternative illuminator imaging apparatus 100 may be located within a desirable range from an object to be scanned. In some embodiments, one or more properties of the alternative illuminator imaging apparatus 100, and/or the sub-assemblies thereof, affect the minimum and/or maximum distance of the alternative illuminator imaging apparatus 100. For example, in at least one example context, the minimum and/or maximum distance required for the alternative illuminator imaging apparatus 100 to operate with an acceptable likelihood of operating properly (e.g., successfully scanning a visual indicia) is defined by the intensity of one or more illuminator source(s) of the alternative illuminator assembly 104 and/or multi-sensor imaging engine 102, depth of focus for one or more imagers, and/or the like, or a combination thereof.

Example Alternative Illuminations Produced by an Example Alternative Illuminator Assembly FIGS. 3A, 3B, and 3C illustrate an example visualization depicting a first illumination produced by an alternative illuminator assembly, such as an alternative illuminator assembly 104. In at least one example context, the first illumination embodies a uniform bounce flash illumination. Specifically, FIG. 3A depicts, from a first side angle, the first illumination produced by the alternative illuminator assembly 104. FIG. 3B depicts, from a first perspective angle, the first illumination produced by the alternative illuminator assembly 104 within the alternative illuminator imaging apparatus 100. FIG. 3C depicts, from the first side angle, the first illumination produced by the alternative illuminator assembly 104 within the alternative illuminator imaging apparatus 100 for bounce flash illumination of a particular field of view.

As illustrated in FIGS. 3A, 3B, and 3C, the first illumination 302 is angled at a first illumination angle, for example illumination angle 308, with respect to an object and/or surface, for example including a direct parts marking indicia to be read. It should be appreciated that the illumination may include various light rays each associated with its own illumination angle, such that the illumination angle 308 represents one such angle of the projected illumination. The first illumination angle 308 represents the angle at which the first illumination 302 is projected. In some example contexts, for example as illustrated, the first illumination angle 308 associated with the illumination 302 represents a downward facing angle with respect to the alternative illuminator assembly 104 and/or the alternative illuminator imaging apparatus 100. In this regard, the illumination angle 308 may be defined based on a normal axis with respect to one or more image sensor(s) for capturing one or more field of views, for example where the field of views include an object, direct part marking indicia, and/or the like, to be illuminated via by the alternative illuminator assembly 104. In this regard, the normal axis represents a forward direction from the alternative illuminator assembly 104 and/or alternative illuminator imaging apparatus 100, and a second axis defines the orientation of the illuminator source producing the first illumination 302 with respect to the normal axis.

As illustrated, the first illumination 302 may be produced by the alternative illuminator assembly 104 within the alternative illuminator imaging apparatus 100, for example as illustrated in FIGS. 3B and 3C. Additionally, for example as illustrated in FIG. 3C, the alternative illuminator imaging apparatus 100 is further associated with the field of view 304. The field of view 304 may define the area capturable by one or more of the imagers within an imaging engine of the alternative illuminator imaging apparatus, for example captured by imagers of the multi-sensor imaging engine 102. In this regard, the illumination 302 is produced to illuminate the field of view 304 for capture by the multi-sensor imaging engine 102.

Further, as illustrated in FIG. 3C, the first illumination 302 is projected at a downward angle with respect to the alternative illuminator imaging apparatus 100 when the alternative illuminator imaging apparatus 100, for example when the alternative illuminator imaging apparatus 100 is in a forward-facing orientation. For example, as illustrated, the illumination angle 308 may embody a downward facing angle in a circumstance where the alternative illuminator imaging apparatus 100 is oriented parallel to a surface for reflection, for example the surface 306 located beneath the alternative illuminator imaging apparatus 100. In at least one example context, the illumination angle 308 corresponds to a desired angle based on one or more configurations of the alternative illuminator assembly and/or at least one associated imager, for example one or more imager(s) within an associated imaging engine. In one such example, the illumination angle 308 comprises a minimum angle of half the vertical field angle of one or more associated imager(s). In some such embodiments, the illumination angle 308 represents an angle less than or equal to 60 degrees to maintain efficiency with respect to the produced illumination.

The surface 306 may embody any surface such that at least a portion of the first illumination 302 is reflected off the surface 306 towards the field of view to be captured. In some embodiments, the surface 306 is embodied by any of a number of surfaces upon which an object that includes a direct part marking indicia to be read is placed, and/or an associated surface located in close proximity to the object that includes a direct part marking indicia to be read. As a non-limiting set of examples, the surface 306 may be embodied by a table, conveyor belt, machinery surface, floor, and/or the like, upon which the object including the direct part marking indicia is placed for reading. Depending on the physical properties of the surface 306, some amount of the first illumination 302 may reflect off of the surface 306 towards the field of view 304. For example, the material that the surface 306 is made of, the shape and/or curvature of the surface 306, and/or the like, may each affect the amount of light reflected off the surface 306 towards the field of view 304. It should be appreciated that, in some example contexts and as is often the case, the surface 306 may not be a mirror-like surface that reflect. In some such example contexts, the first illumination 302 is reflected, or "bounced," off the surface 306 to form an equivalent diffused uniform illumination. In such contexts, the equivalent diffused uniform nature of the reflected illumination may further reduce the likelihood of specular reflection effects due to bright illumination of the direct part marking indicia causing pattern noise. In some example contexts, the surface 306 is at least a mirror-like, partially reflective surface, such that the reflected light is based on the reflective properties of the mirror-like surface. As illustrated in FIG. 3C, the reflected light is represented by the reflected illumination 310.

The reflected illumination 310 illuminates the field of view 304 at a reflected illumination angle based on the angle at which the reflected illumination 310 is reflected off the surface 306. In this regard, the reflected illumination 310 illuminates the field of view 304 at a different illumination angle than one or more illuminations produced by one or more illuminator sources of the multi-sensor imaging engine 102 of the alternative illuminator imaging apparatus 100. For example, in comparison to the reflected illumination 310, each of the illuminator sources of the multi-sensor imaging engine 102 may produce an illumination that illuminates the field of view 304 at a direct angle parallel to the field of view 304, or substantially parallel to the field of view 304

The reflected angle at which the reflected illumination 310 illuminates the field of view 304 may enable the alternative illuminator imaging apparatus 100 to capture one or more image data objects of an object having a direct part marking indicia within the field of view 304. The reflected illumination 310 illuminates the field of view 304 sufficiently to avoid specular reflection effects that may be caused by illumination at an angle parallel to the field of view 304, for example produced by one or more illuminator sources of the multi-sensor imaging engine 102 of the alternative illuminator imaging apparatus 100. As such, the captured image data object(s) representing the field of view 304 illuminated based on the reflected illumination 310 may have a reduced number of instances of specular reflection effects, and/or otherwise be free from specular reflection effects, that may negatively affect the detecting and/or decoding of a direct parts marking indicia represented within the captured image data object(s). In this regard, the reflected illumination 310 enables capture of image data object(s) including a direct part marking indicia that is more likely to be successfully detectable and/or decodable by the alternative illuminator imaging apparatus 100, such as in circumstances where the direct part marking indicia embodies a highly reflective direct part marking indicia.

It should be appreciated that, in some embodiments, the alternative illuminator imaging apparatus 100 is associated with a minimum and/or maximum distance from a lower surface, such as the surface 306, for operation. For example, in at least one example context, the minimum and/or maximum distance from the surface 306 defines a range within which the alternative illuminator imaging apparatus 100 is configured to successfully scan within a desired likelihood of success. It should be appreciated that there may be no technical minimum distance and/or maximum distance at which the apparatus 100 may be located, and such distances may be based on any number of properties associated with the alternative illuminator imaging apparatus 100 and/or one or more subcomponents thereof. In at least one example embodiment, the operable range for a desired threshold of successfully scanning a visual indicia comprises 50 mm-300 mm.

FIGS. 4A, 4B, and 4C each illustrate an example visualization depicting a second illumination produced by an alternative illuminator assembly, such as an alternative illuminator assembly 104. In at least one example context, the second illumination embodies a dark-field illumination. Specifically, FIG. 4A depicts, from a first side angle, the second illumination produced by the alternative illuminator assembly 104. FIG. 4B depicts, from a first perspective angle, the second illumination produced by the alternative illuminator assembly 104 within the alternative illuminator imaging apparatus 100. FIG. 4C depicts, from the first side angle, the second illumination produced by the alternative illuminator assembly 104 within the alternative illuminator imaging apparatus 100 for dark-field illumination of a particular field of view.

In this regard, the dark-field illumination may provide adequate illumination of a field of view to enable capture of image data objects including direct part marking indicia(s) of various types such that the direct part marking indicia(s) may be successfully detected and/or decoded from the image data object. In this regard, the separation between the alternative illuminator assembly 104 and a corresponding multi-sensor imaging engine may create a high angle of incidence between the second illumination and the normal axis associated with one or more image sensors of the multi-sensor imaging assembly. In this regard, reflective and/or polished surfaces will be imaged as dark surfaces by the image sensor as minimal and/or no light will interact with the mirrored surface and reflect towards the image sensor for capture. Surface textures, such as direct part marking indicia created via an impacted surface creating indented data points, as illustrated below with respect to FIG. 12 for example, may cause such features to be illuminated as dark features with respect to the non-impacted portions of the object surface. In this regard, low and/or no-contrast direct part markings may be represented in one or more image data objects, captured by one or more image sensors of a corresponding multi-sensor imaging engine, with adequate illumination such that the direct part marking indicia(s) may be successfully detected from the image data object(s) and/or successfully decoded.

As illustrated in FIGS. 4A, 4B, and 4C, the second illumination 402 is angled at a second illumination angle, for example illumination angle 404, with respect to an object and/or surface, for example including a direct parts marking indicia to be read. It should be appreciated that the illumination may include various light rays each associated with its own illumination angle, such that the illumination angle 404 represents one such angle of the projected illumination. The second illumination angle 404 may represent the angle at which the second illumination 402 is produced. In the example context as illustrated, the second illumination angle 404 associated with the illumination 402 represents an angle towards the field of view visible to the captured by an alternative illuminator imaging apparatus, such as the alternative illuminator imaging apparatus 100. In this regard, the illumination angle 404 may be defined based on the normal imaging axis with respect to one or more image sensors of a multi-sensor imaging engine associated with the alternative illuminator assembly 104, for example a forward direction from the alternative illuminator assembly 104 and/or the one or more image sensors of an alternative illuminator imaging apparatus 100, and a second axis defines the orientation of the illuminator source with respect to the normal axis.

In at least one example context, the illumination angle 404 additionally or alternatively corresponds to a desired angle based on one or more configurations of the alternative illuminator assembly and/or at least one associated imager, for example one or more imager(s) within an associated imaging engine. In one such example, the illumination angle 308 comprises a minimum angle of half the horizontal field angle of one or more associated imager(s), such as a near-field imager and/or far-field imager of an associated imaging engine. In some such embodiments, the illumination angle 404 is not limited to a maximum angle for purposes of functionality. Indeed, in at least some example contexts, as large an illumination angle as possible may be desirable within the functional constraints of the components therein, for example such that the produced illumination, for example illumination 402, sufficiently illuminates the desired field of view, for example field of view 304. The illumination angle 404, in some contexts, is limited by the placement of the alternative illuminator within one or more imaging apparatuses. For example, in at least one circumstance where the alternative illuminator assembly is located along a terminal edge of a mobile imaging apparatus as described herein, the mobile imaging apparatus further including an imaging engine, the illumination angle 404 may be limited by the length of the terminal edge and the location of the imaging engine along the terminal edge. In some such embodiments, the illumination angle 404 is greater than the illumination angle associated with one or more other alternative illuminations generated by the alternative illuminator assembly 104, for example greater than the illumination angle 308 as described with respect to illumination 302, to enable enhanced dark-field illumination.

As illustrated, the second illumination 402 may be produced by the alternative illuminator assembly 104 within the alternative illuminator imaging apparatus 100, for example as illustrated in FIGS. 4B and 4C. Additionally, for example as illustrated in FIG. 4C, the alternative illuminator imaging apparatus 100 is further associated with the field of view 304. The field of view 304 may define the area capturable by one or more of the imagers within an imaging engine of the alternative illuminator imaging apparatus 100, for example captured by imagers of the multi-sensor imaging engine 102. In this regard, the illumination 402 is produced at a particular angle towards the field of view to be captured, for example to illuminate the field of view 304 for capture by the multi-sensor imaging engine 102.

FIGS. 5A, 5B, and 5C illustrate various visualizations of the alternative illuminator assembly 104 projecting the first illumination 302 and second illumination 402. Specifically, FIG. 5A illustrates a first perspective view of the alternative illuminator assembly 104 projecting the first illumination 302 and second illumination 402. FIG. 5B illustrates a first side view of the alternative illuminator assembly 104 projecting the first illumination 302 and second illumination 402. FIG. 5C illustrates another side view of the alternative illuminator assembly 104 projecting the first illumination 302 and second illumination 402.

As illustrated in FIG. 5A, the first illumination 302 and second illumination 402 each are defined by light projected within a defined field. In at least one example context, the alternative illuminator assembly 104 is intended to be used to illuminate a field of view to be captured by another component, for example a multi-sensor imaging engine associated with the alternative illuminator assembly 104. The alternative illuminator assembly 104 may be designed such that a dark-field illumination is always produced at an angle towards a field of view to be captured, regardless of the orientation of the alternative illuminator imaging apparatus. The orientation of the alternative illuminator imaging apparatus may thus be changed without affecting the illumination of the field of view, for example the alternative illuminator assembly oriented differently to enable comfort for the user or enable one of the illuminations 302 or 402 to be produced in a downward facing direction for purposes of illuminating a field of view from above.

As illustrated in FIG. 5B, for example, the second illumination 402 may be projected towards the field of view to illuminate the field of view, or more specifically a surface, object, and/or one or more direct part marking indicia(s) within the field of view, at a high angle of incidence. In some embodiments, the alternative illuminator assembly 104 is located at a second location along a terminal edge of an apparatus chassis, for example where the second location is less than a predetermined distance from a second end of the terminal edge, the second end of the terminal edge located opposite a first end of the terminal edge. In this regard, the second location may be substantially near (e.g., within the predetermined distance) from a second corner (e.g., where the terminal edge meets a side edge of the apparatus chassis), the second corner opposite a first corner for the apparatus chassis. In at least one example context, the second corner may be less than a predetermined distance from where a multi-sensor imaging engine and/or other sub-assembly is located at the second location along the terminal edge for capturing one or more image data objects representing a particular field of view visible to the multi-sensor imaging engine. Alternatively or additionally, in at least some embodiments, the first location along the terminal edge may be located at a predefined distance from the second location along the terminal edge. In yet some other embodiments, the first location is less than or equal to a maximum predefined distance from the second location along the terminal edge, for example where the alternative illuminator assembly 104 may be positioned no more than X mm from the imaging engine 102. It should be appreciated that, additionally or alternatively in at least some other embodiments, the first location and second location may be associated with a minimum predefined distance, for example where the alternative illuminator assembly 104 may be positioned no less than X mm from the imaging engine 102.

In this regard, as illustrated in FIG. 5B, the second illumination 402 may be projected towards the multi-sensor imaging engine and thus towards the field of view to be captured. The angle of incidence between the normal axis of the image sensor(s) defining the field of view and the second illumination 402 may embody a value greater than a desired threshold angle. In this regard, the second illumination 402 may embody a dark-field illumination for purposes of illuminating a field of view capturable by the alternative illuminator imaging apparatus. In this regard, due to the angle of incidence with respect to the field of view and/or an object to be captured, surface features of an object and/or other surface representing a direct part marking indicia, and/or low or non-contrast direct part marking indicia(s) within the field of view may be illuminated in a manner that enables the captured image data object(s) representing the field of view to be processed to successfully detect and decode the direct part marking indicia therein.

As illustrated in FIG. 5C, for example, the first illumination 302 may be projected at the downward facing angle. In some such embodiments, the alternative illuminator assembly 104 produces the first illumination 302 at the downward facing angle in a circumstance when an imaging apparatus is oriented in a forward-facing, for example such that the alternative illuminator imaging apparatus is oriented parallel with the ground and/or a lower surface below the alternative illuminator imaging apparatus. In some embodiments, the alternative illuminator assembly 104 is located towards a second corner of the apparatus chassis, the second corner opposite a first corner of a terminal edge for an apparatus chassis, for example where a multi-sensor imaging engine and/or other apparatus is located at the second location for capturing one or more image data objects representing a particular field of view. In this regard, as illustrated in FIG. 5C, the first illumination 302 may be projected at a downward facing angle towards a surface for reflecting towards the field of view to be captured. Accordingly, the field of view to be captured may be illuminated by the first illumination 302 after reflection, and thus illuminated at a reflected illumination angle. The reflected illumination angle may be an upward facing angle such that the field of view is illuminated from below. In this regard, the first illumination 302 may embody a bounce field illumination for purposes of illuminating the field of view capturable by the alternative illuminator imaging apparatus. Due to angle of incidence with respect to the reflected illumination angle, the specular reflection of the first illumination 302 off of an object in the field of view for capture may minimized such that the captured image data objects are unlikely to be affected by specular reflection effects. Thus, particularly for highly reflective direct part marking indicia, the first illumination 302 improves the likelihood such captured image data objects represent data from which the direct part marking indicia can be successfully detected and/or decoded. Similarly, when oriented as such, the second illumination 402 may provide a specific dark-field illumination of the field of view to be captured.

In some embodiments, the alternative illuminator assembly 104 is activated based on one or more activation signals. For example, a first activation signal may be transmitted to the alternative illuminator assembly to activate a first illuminator source of the alternative illuminator assembly 104. In this regard, the first illuminator source may be used to produce the first illumination 302. Additionally or alternatively, in some embodiments, a second activation signal may be transmitted to the alternative illuminator assembly 104 to activate a second illuminator source of the alternative illuminator assembly 104. The second illuminator source may be used to produce the second illumination 402. In some embodiments, one or more external and/or associated processing circuitry, apparatuses, engines, devices, systems and/or the like are configured to transmit the activation signal. In some embodiments, for example, the activation signal is generated based on the results of an image processing algorithm, for example performed by a multi-sensor imaging engine and/or associated processing circuitry. In this regard, the activation signal be configured to activate a first illuminator source associated with the first illumination 302 in a circumstance where the image processing algorithm indicates specular reflect effects one or more captured image data objects, and/or the activation signal may be configured to activate the second illuminator source associated with the second illumination 402 in a circumstance where the image processing algorithm indicates a low and/or no-contrast environment.

Example Assembly and Components of an Alternative Illuminator Assembly

Having described the functionality of example alternative illuminator assemblies and corresponding alternative illuminator imaging apparatuses above, the individual components and structure of embodiment the alternative illuminator assemblies will now be described. It should be appreciated that, in other embodiments, one or more of the components may differ from the embodiment(s) as depicted, for example utilizing similar components. Accordingly, the depicted embodiments are not to limit the scope and spirit of the disclosure.

FIGS. 6A and 6B each illustrate an exploded view of components of an alternative illuminator assembly, for example an exploded view of the alternative illuminator assembly 104, in accordance with at least some example embodiments of the present disclosure. Specifically, FIG. 6A illustrates a first perspective of the exploded view of the front faces for the components of the alternative illuminator assembly. FIG. 6B illustrates a second perspective view of the back faces for the components of the alternative illuminator assembly. The illustrated components further include an illuminator lens surface 602, an illuminator component board 604, a heat sink 606, and an assembly securing component 608. Each component is specially designed to interact and align such that the formed alternative illuminator assembly is of a small form factor sufficient for fitting in a small form factor mobile apparatus chassis such as a cell phone apparatus chassis.

The illustrated components include the illuminator component board 604. The illuminator component board 604 may provide hardware for producing one or more illuminations. In this regard, in some embodiments, the illuminator component board 604 comprises at least one or more illuminator sources, as well as hardware for powering each illuminator source and/or connecting each illuminator source to one or more hardware, devices, circuitry, and/or the like for controlling activation of each illumination source. For example, in some embodiments, the illuminator component board 604 comprises a printed circuit board (PCB), such as a flexible PCB and/or rigid flex PCB, including and/or connected to one or more illuminator sources. It should be appreciated that the illuminator component board 604 may comprise any of a number of suitable materials for transmitting electrical signals to and/or between the subcomponents thereof and/or associated connected components. The illuminator component board 604 is further illustrated and described below with respect to FIGS. 9A-9E.

The illustrated components further include the illuminator lens surface 602. The illuminator lens surface 602 may provide one or more optical components for projecting each of the illumination(s) produced by the illuminator source, for example of the illuminator component board 604, in a desired illumination pattern and/or at a desired illumination angle. The illuminator lens surface 602 may include one or more optical components through which an illumination can pass through. In this regard, the illuminator lens surface 602 may be constructed of, and/or include one or more subcomponents constructed of, optical glass and/or plastic designed to enable light embodying one or more illuminations to pass through. Additionally or alternatively, in at least some example contexts, the illuminator lens surface 602 and/or one or more subcomponents thereof defines an enclosure for fitting the alternative illuminator assembly within an alternative illuminator imaging apparatus. The illuminator lens surface 602 is further illustrated and described below with respect to FIGS. 8A-8C.

The illustrated components further include the heat sink 606. Heat sink 606 may provide heat dissipation functionality with respect to one or more other of the illustrated components. For example, the heat sink 606 may provide heat dissipation for each of the illuminators included in and/or otherwise associated with the illuminator component board 604. In this regard, the heat sink 606 may be designed to provide such functionality to maximize the lifespan of each component and/or otherwise ensure that the alternative illuminator assembly continues to function as intended.

In some embodiments, the heat sink 606 is designed to provide support for the illuminator component board 604. The heat sink 606 may provide support such that each illuminator source connected to the illuminator component board 604 is aligned at a particular illumination angle with respect to a forward angle associated with the alternative illuminator assembly. Specifically, as illustrated for example, the heat sink 606 may be designed so as to support a first illuminator source of the illuminator component board 604 at a first predetermined downward facing angle when the alternative illuminator assembly, for example when in a particular forward-facing orientation. Further, the heat sink may be designed to support a second illuminator source of the illuminator component board 604 at a second predetermined angle, for example towards a field of view to be captured by an associated multi-sensor imaging apparatus when the alternative illuminator assembly is in the forward-facing orientation. Additionally or alternatively, the illuminator lens surface 602 may be designed such that one or more reflectors and/or illumination lenses therein are each properly aligned with an illuminator source of the illuminator component board 604 for producing such illuminations when the alternative illuminator assembly is properly assembled.

The illustrated components further include the assembly securing component 608. The assembly securing component 608 may engage each of the components to position and/or align each component with one another during assembly. In at least one example context, the assembly securing component 608 is embodied by an assembly securing screw configured to engage an assembly securing opening of each component when the components 602-606 are properly aligned. By engaging the components, the assembly securing component 608 locks the position and/or alignment of each of the components in place, such that components remain a desired position and/or alignment when assembled. In this regard, the assembly securing component 608 may be engaged and rotated in a first direction, for example clockwise, to engage the assembly securing component 608 with each of the illustrated components 602-606, and rotated in a second direction, for example counter-clockwise, to disengage the assembly securing component 608 with each of the illustrated components 602-606.

FIGS. 7A and 7B illustrate the components assembled in place to form the alternative illuminator assembly 104. Specifically, FIG. 7A depicts the assembled alternative illuminator assembly 104 from a first perspective view. FIG. 7B depicts the assembled alternative illuminator assembly 104 from a first side view.

As illustrated, the components of the assembled alternative illuminator assembly 104 are each positioned and aligned for operation, and secured in place via the assembly securing component 608 (not shown in FIGS. 7A and 7B). Specifically, the illuminator component board 604 is positioned and aligned with respect to the illuminator lens surface 602 such that the illuminator sources each produce an illumination for projection via associated optical components, as described below. Further in this regard, the illuminator component board is secured in place by engaging with the heat sink 606. As such, the heat sink 606 not only is designed to keep the illuminator component board in place, but also provide heat dissipation functionality to each of the illuminator sources thereof.

Example Details of Alternative Illuminator Assembly Components

Having described the interaction between the various components of example alternative illuminator assemblies, details of an example illuminator lens surface and illuminator component board will now be described. It should be appreciated that, in other embodiments, one or more additional and/or alternative details may be included in the component design. Additionally or alternatively, similar designs may be created that similarly reflect the component details described herein, for example where the included components are identical as depicted but positioned as mirrored across one or more axes. Accordingly, in this regard, the depicted embodiments are exemplary and not to limit the scope and spirit of the disclosure.

FIGS. 8A-8C each depict various subcomponents of an example illuminator lens surface. Specifically, FIG. 8A depicts a first perspective view of the illuminator lens surface and various subcomponents. FIG. 8B depicts a first side view of the illuminator lens surface and various subcomponents. FIG. 8C depicts a second perspective view of the illuminator lens surface and various subcomponents. The FIGS. 8A-8C each illustrate an example illuminator lens surface, specifically the illuminator lens surface 602.

The illuminator lens surface 602 includes an assembly securing opening 806. As illustrated, the assembly securing opening 806 is embodied by an opening in a side face of the illuminator lens surface 602. The assembly securing opening 806 is designed for alignment with one or more other assembly securing openings of one or more other components of an alternative illuminator assembly, for example such that the assembly securing openings of each component are aligned when the components are properly positioned and/or aligned to be secured for operation. In some embodiments, the assembly securing opening 806 is designed to enable engagement by a corresponding assembly securing component, such as the assembly securing component 608 as illustrated in FIGS. 6A and 6B. In this regard, for example, the assembly securing opening 806 may be defined by an outer rim designed to allow a corresponding assembly securing component to fit through the assembly securing opening 806. Additionally or alternatively, in some embodiments, the assembly securing opening 806 is defined by a threaded outer rim, such that an assembly securing component may engage with the threads to keep the assembly securing component in place upon engaging with the assembly securing opening 806.

In some embodiments, an example illuminator lens surface 602 further includes various optical components for projecting, from one or more incoming light sources, one or more illuminations of a predefined illumination pattern and/or at a desired illumination angle. In this regard, the illuminator lens surface 602 may include at least a pair of a reflector and an illumination lens for each illuminator source to be aligned with the illuminator lens surface 602. In this regard, each reflector may be designed to reflect, collimate, and/or otherwise focus incoming light at a desired angle towards a corresponding illumination lens. The light reflected from the reflector enters the illumination lens corresponding with the reflector to produce an illumination of a certain pattern and/or at a desired illumination angle based on the illumination lens.

In this regard, for example, the illuminator lens surface 602 includes reflector 802A and illumination lens 804A. The reflector 802A embodies a first triangular prism reflector, and in other embodiments may be embodied by any of a number of other shaped reflectors. The reflector 802A is designed to enable a corresponding illuminator source to be positioned along a face of the reflector 802A, and that produced light will be reflected into illumination lens 804A for projecting a corresponding illumination at a desired illumination angle. In this regard, the reflector 802A may be constructed of any of a number of materials and designed for reflecting incoming light into the illumination lens 804A for projection. The illumination lens 804A may subsequently receive the incoming light and project a corresponding illumination based on the incoming light. In some embodiments, the illumination lens 804A is designed to collimate and/or spread the incoming light into an illumination across a particular field. In some embodiments, the illumination lens 804A is embodied by a first lens array designed to project a corresponding illumination from the incoming light via the reflector 802A.

As illustrated, the illumination lens 804A and reflector 802A are each positioned on a front face of the illuminator lens surface 602. Specifically, the illumination lens 804A and reflector 802A may be designed to enable projection of an illumination at a desired angle from an incoming light source. For example, the illumination produced by the illumination lens 804A in conjunction with the reflector 802A may be at least partially horizontal, or otherwise in a side-facing direction in the depicted orientation (for example, facing away from the side face including the assembly securing opening 806), such that the illumination lens 804A and reflector 802A are oriented for producing an illumination towards a field of view captured by an associated multi-sensor imaging engine.

Further, as illustrated, the illuminator lens surface 602 includes reflector 802B and illumination lens 804B. The reflector 802B embodies a second triangular prism reflector, and in other embodiments may be embodied by any of a number of other shaped reflectors. The reflector 802B is designed to enable a corresponding illuminator source to be positioned along a face of the reflector 802B, and that the produced light will be reflected into illumination lens 804B for projecting a corresponding illumination at a desired illumination angle. In this regard, the reflector 802B may be constructed of any of a number of materials and designed for reflecting incoming light into the illumination lens 804B for projection. The illumination lens 804B may subsequently receive the incoming light and project a corresponding illumination based on the incoming light. In some embodiments, the illumination lens 804B is designed to collimate and/or spread the incoming light into an illumination across a particular field. In some embodiments, the illumination lens 804B is embodied by a second lens array designed to project a corresponding illumination from the incoming light via the reflector 802B.

As illustrated, the illumination lens 804B and reflector 802B are each positioned on a bottom face of the illuminator lens surface 602. Specifically, the illumination lens 804B and reflector 802B may be designed to enable projection of an illumination at a downward facing angle from an incoming light in a circumstance where the illuminator lens surface 602 is oriented in a forward-facing direction. In this regard, the illumination angle associated with the illumination lens 804B and reflector 802B may be angled to enable producing the illumination towards a bottom surface for purposes of reflecting the illumination as a bounce-flash illumination of a field of view. In this regard, the illumination may be produced at a downward facing angle such that a reflected portion of the illumination illuminates the field of view with a sufficiently high angle of incidence to prevent undesired specular reflective effects.

Figure 9A:
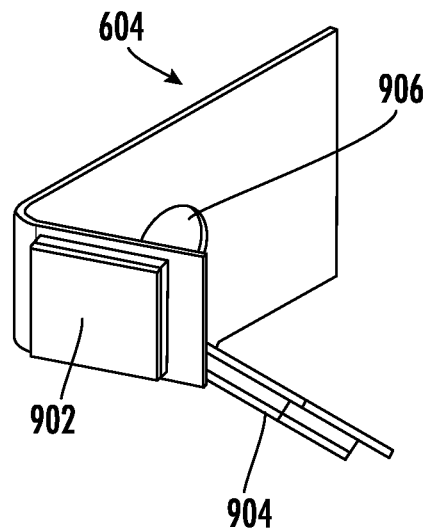
Figure 9B:
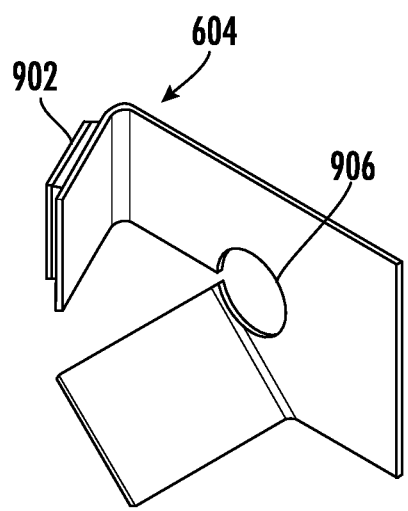
Figure 9C:
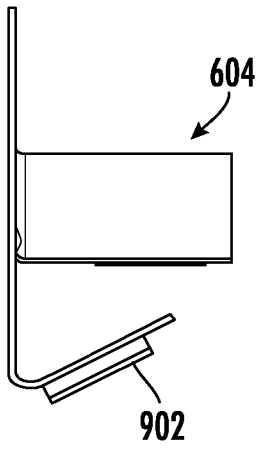
Figure 9D:
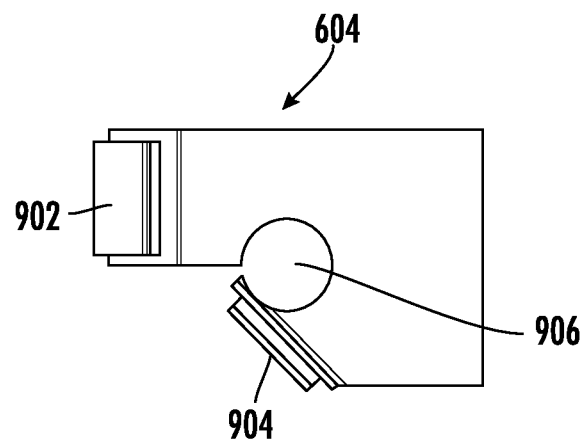
Figure 9E:
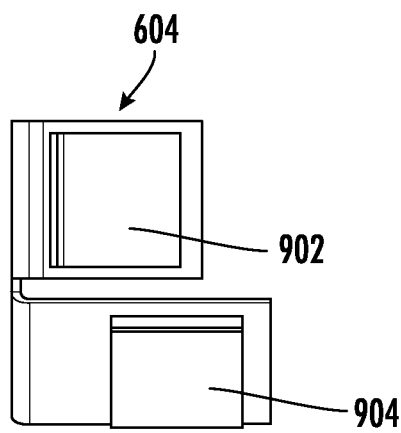

FIGS. 9A-9E each depict various subcomponents of an example illuminator component board. Specifically, FIG. 9A depicts a first perspective view of the example illuminator component board and various subcomponents thereof. FIG. 9B depicts a second perspective view of the illuminator component board and various subcomponents thereof. FIG. 9C depicts a top-down view of the illuminator component board and various subcomponents thereof. FIG. 9D depicts a first side view of the illuminator component board and various subcomponents thereof. FIG. 9E depicts a front view of the example illuminator component board and various subcomponents thereof. The FIGS. 9A-9E each illustrate an example illuminator component board, specifically the illuminator component board 604.

The illuminator component board 604 includes an assembly securing opening 906. As illustrated, the assembly securing opening 906 is embodied by an opening in a side face of the illuminator component board 604. The assembly securing opening 906 is designed for alignment with one or more other assembly securing openings of one or more other components of an alternative illuminator assembly, for example such that the assembly securing openings of each component are aligned when the components are properly positioned and/or aligned to be secured for operation. In one such example embodiment, the side face of the illuminator component board 604 that includes the assembly securing opening 906 is designed to be aligned with a side face of the illuminator lens surface 602 that includes the assembly securing opening 906. In some embodiments, the assembly securing opening 906 is designed to enable engagement by a corresponding assembly securing component, such as the assembly securing component 608 as illustrated in FIGS. 6A and 6B. In this regard, for example, the assembly securing opening 906 may be defined by an outer rim designed to allow a corresponding assembly securing component to fit through the assembly securing opening 906. Additionally or alternatively, in some embodiments, the assembly securing opening 906 is defined by a threaded outer rim, such that the assembly securing component may engage with the threads to keep the assembly securing component in place upon engaging with the assembly securing opening 906.

The illuminator component board 604 may embody a printed circuit board including hardware for powering one or more subcomponents thereof and/or transmitting one or more signals to the one or more subcomponents thereof. For example, in this regard, the illuminator component board 604 may include at least one or more illuminators configured for powering and/or activation via the illuminator component board 604. The illuminator component board 604 may be configured for connection to one or more other hardware components, for example one or more processors, imaging engines, and/or the like, to provide such power and/or activation signals.

As illustrated, the illuminator component board 604 includes two illuminator source, specifically illuminator source 902 and illuminator source 904. As depicted, the illuminator source 904 is aligned at a first angle, specifically to produce light at a downward facing angle. In this regard, the light produced by the illuminator source 904 may enter one or more optical components of the illuminator lens surface 602, for example reflector 802B, for projecting a corresponding illumination at a desired illumination angle. In an example embodiment, the illuminator source 904 is configured to produce light for projecting a bounce flash illumination to illuminate a certain field of view in a circumstance where illuminator component board 604 is oriented as depicted. As such, the illuminator source 904 may be specifically configured, for example to produce a certain intensity level, and/or the like, to produce the desired light for use in projecting the corresponding bounce flash illumination.

The illuminator source 902 is aligned at a second angle, specifically to produce light at a downward facing angle. In this regard, the light produced by the illuminator source 902 may enter one or more optical components of the illuminator lens surface 602, for example reflector 802A, for projecting a corresponding illumination at a desired illumination angle. In an example embodiment, the illuminator source 902 is configured to produce, towards the field of view, light embodying a dark-field illumination to illuminate the field of view. For example, in some embodiments, rotating causes the illumination produced by the illuminator source 902 and/or corresponding optical components such as one or more reflectors and/or illumination lenses to project an illumination at an illumination angle in line with a field of view to be illuminated by the illumination. As such, the illuminator source 902 may also be specially configured, for example to produce a desired intensity level, and/or the like, to produce the desired light for use in projecting the corresponding dark-field illumination. In some embodiments, the illuminator source 902 and illuminator source 904 are configured the same. In other embodiments, the illuminator source 902 and illuminator source 904 are configured differently from one another.

In some embodiments, the illuminator component board 604 is designed such to support the illuminator source 902 and/or illuminator source 904 in specific positions associated with desired illumination angles, for example as illustrated. In some such embodiments, the illuminator component board 604 is rigid at least in one or more portions that connect to each of the illuminator source 902 and/or illuminator source 904. Additionally or alternatively, in some such embodiments, the illuminator component board 604 is flexible, and/or otherwise is configured to bend, at a junction connecting the rigid portion to the side face of the illuminator component board 604, for example the face including the assembly securing opening 906. In this regard, the portions of the illuminator component board 604 that support the illuminator source 902 and/or illuminator source 904 may further be supported by one or more other components of the alternative illuminator assembly when appropriately positioned and/or aligned. For example, as described, in some embodiments at least a portion of the illuminator component board 604 and illuminator source 902 are supported by a first face of a heat sink, such as the heat sink 606, and one or more components of an illuminator lens surface, such as a first reflector 802A, to properly orient the illuminator source 902. Additionally or alternatively, as described, in some embodiments at least a portion of the illuminator component board 604 and illuminator source 904 are supported by a second face of a heat sink, such as the heat sink 606, and one or more components of an illuminator lens surface, such as a second reflector 802B, to properly orient the illuminator source 904.

Example Details of Example Imaging Engine

FIGS. 10A and 10B illustrate various visualizations of a multi-sensor imaging engine in accordance with at least some example embodiments of the present disclosure. Specifically, FIG. 10A depicts a first front perspective view of the multi-sensor imaging engine 102. FIG. 10B depicts a front orthogonal view of the multi-sensor imaging engine 102. As described, in some embodiments a multi-sensor imaging engine is associated with an alternative illuminator assembly within an imaging apparatus. In this regard, the multi-sensor imaging engine 102 may include one or more components, such as processing circuitry, hardware, and/or the like, to control one or more components of the multi-sensor imaging engine and the alternative illuminator assembly. Additionally or alternatively, in some embodiments, one or more external components is configured for controlling one or more components of the multi-sensor imaging engine and one or more components of the alternative illuminator assembly.

As illustrated, the multi-sensor imaging engine 102 includes at least a near-field imager 1004, a far-field imager 1006, integrated illumination-aimer optics 1002, and a circuit board 1008. In some embodiments, the near-field imager 1004 includes at least near-field optical components, such as one or more lenses, defining a particular near field of view for capture by an associated near-field image sensor. In this regard, light may traverse through the near-field optical components to interact with the near-field image sensor for capture, for example in a near-field image data object representing the near-field of view captured by the near-field image sensor. In some such embodiments, the near-field optical components manipulate the light as it traverses, for example to focus the light towards specific portions of the near-field image sensor. Similarly, in some embodiments, the far-field imager 1006 includes at least far-field optical components, such as one or more lenses, defining a particular far-field of view for capture by an associated far-field image sensor. In this regard, light may traverse through the far-field optical components to interact with the far-field image sensor for capture, for example in a far-field image data object representing the far-field of view captured by the far-field image sensor. In some embodiments, the far-field optical components manipulate the light as it traverses, for example to focus the light towards specific portions of the far-field image sensor.

The circuit board 1008 may be embodied by circuitry, hardware, and/or the like configured for transmitting power and/or electrical signals between one or more control units, such as a processor, processing circuitry, and/or the like, and one or more components attached to the circuit board 1008. In some such embodiments, the circuit board 1008 comprises a printed circuit board, such as a flexible printed circuit board, having one or more additional components connected or otherwise integrated therewith. For example, in at least one example embodiment, the circuit board 1008 includes at least a near-field image sensor for the near-field imager 1004, such as located behind one or more optical components, such as one or more lenses, of the near-field imager 1004. In some embodiments, the circuit board 1008 further includes at least a near-field image sensor for the far-field imager 1006, such as located behind one or more optical components, such as one or more lenses, of the far-field imager 1006. In this regard, the circuit board 1008 may provide power and/or activation signals to the image sensors to cause each of the image sensors to activate and capture an image data object.

Additionally or alternatively, the circuit board 1008 may include one or more illuminator sources configured to produce light for projecting by the multi-sensor imaging engine 102. For example, in some embodiments, each of the near-field imager 1004 and far-field imager 1006 are associated with a corresponding illumination source. In this regard the circuit board 1008 may include at least a near-field illuminator source and a far-field illuminator source. The near-field illuminator source may be configured to produce light intended to illuminate the near-field of view to be captured by the near-field imager 1004, and the far-field illuminator source may be configured to produce light intended to illuminate the far-field of view to be captured by the far-field imager 1006. Additionally or alternatively, the circuit board 1008 may include an aimer source configured to produce an aimer light. In at least one example context, the aimer source comprises an aimer laser source configured to produce a high intensity aimer light for use in generating a corresponding aimer pattern. In some such embodiments, the aimer pattern provides a visual representation that can be used to align the multi-sensor imaging engine 102 with an object to be scanned, for example a direct part marking indicia.

The illuminator source(s) of the multi-sensor imaging engine 102 may further be activated by the circuit board 1008, and/or one or more associated processors. For example, one or more activation signals may be sent via the circuit board 1008 to one or more of the illuminator source(s) to cause the illuminator source(s) to activate and generate a corresponding illumination. In some embodiments, the multiple illuminator sources may be activated in an alternating manner, for example such that reflective effect and/or other negative visual effects caused by combining illuminations from the illuminator sources are minimized and/or eliminated. For example, an alternating illumination pattern between a plurality of illuminator sources, for example a far-field illuminator source and a near-field illuminator source, may reduce specular effects with respect to highly reflective surfaces, which may improve accuracy with respect to scanning a highly reflective direct part marking visual indicia.

The integrated illumination-aimer optics 1002 comprises a single piece optical component include a plurality of subassemblies for producing various illuminations and/or other projections. For example, as illustrated in FIG. 10B, the integrated illumination-aimer optics 1002 includes an aimer pattern projector 1002C. The aimer pattern projector 1002C may be aligned with an aimer source, such that the light produced by the aimer source interacts with the aimer pattern projector 1002C to project a corresponding aimer illumination. The aimer illumination may comprise a high intensity pattern representing a certain aimer pattern embodied by the aimer pattern projector 1002C.

The integrated illumination-aimer optics 1002 further includes a far-field illumination lens 1002A, a near-field illumination lens 1002B, and an aimer pattern projector 1002C. The near-field illumination lens 1002B may be aligned with a near-field illuminator source, such that the light produced by the near-field illuminator source interacts with the near-field illumination lens 1002B to project a corresponding near-field illumination. Similarly, the far-field illumination lens 1002A may be aligned with a far-field illuminator source, such that the light produced by the far-field illuminator source interacts with the far-field illumination lens 1002A to project a corresponding far-field illumination.

In this regard, multi-sensor imaging engine 102 may be configured to generate one or more illuminations for illuminating one or more the near-field of view and/or far-field of view. Each illumination may be produced at an angle parallel to, and/or substantially parallel, to the field of view(s) defined by the imagers of the multi-sensor imaging engine. In this regard, the produced illuminations may not effectively illuminate one or more direct part marking indicia(s) within the field of view(s).

For example, FIGS. 11 and 12 illustrate representations including direct part marking indicia of particular direct part marking indicia types. Specifically, in at least one example context, the particular direct part marking indicia types as illustrated may be ineffectively illuminated by illumination received at an illumination angle normal to, or substantially normal to, one or more image sensors for capturing a field of view including the direct part marking indicia. In this regard, in at least some example embodiments the direct part marking indicia of the illustrated direct part marking indicia types may be effectively illuminated utilizing one or more produced illumination from an alternative illuminator assembly, as described.

Specifically, for example, FIG. 11 depicts a representation of direct part marking indicia 1104 on object 1102. As illustrated, the object 1102 includes a highly reflective surface, such that the direct part marking indicia 1104 embodies a highly reflective direct part marking indicia. In this regard, the representation includes specular reflection effect 1106. The specular reflection effect 1106 may be caused by an illumination projected at a low incidence angle with respect to the direct part marking indicia 1104. For example, in at least one example context, the specular reflection effect 1106 results from a near-field illumination and/or far-field illumination produced by an illuminator source and/or corresponding illumination lens of a multi-sensor imaging engine.

The specular reflection effects, such as the specular reflection effect 1106, increases the likelihood that the image data object including the direct part marking indicia 1104 cannot be successfully read. For example, the specular reflection effect 1106 makes at least a portion of the direct part marking indicia 1104 appear white regardless of the actual data value represented. Accordingly, such specular reflection effects may cause failure in detecting the direct part marking indicia 1104 from the representation within the captured image data object. Additionally or alternatively, such specular reflect effects may cause failure in successfully decoding the direct part marking indicia 1104 from the representation within the captured image data object.

In some example contexts, an alternative illuminator assembly is configured to project one or more illuminations to effectively illuminate the direct part marking indicia 1104. In this regard, for example, a bounce-flash illumination produced by the alternative illuminator assembly illuminates the direct part marking indicia 1104 such that the captured image data object includes less, or does not include any, specular reflection effects, such as the specular reflection effect 1106. By reducing or eliminating the specular reflection effects, the captured image data object may be more likely to be successfully processed, for example such that the direct part marking indicia 1104 may be successfully detected from the image data object and/or successfully decoded.

FIG. 12 depicts a representation of direct part marking indicia 1204 on object 1202. As illustrated, the object 1202 comprises a monochromatic surface. The direct part marking indicia 1204 comprises a non-contrast direct part marking indicia designed by impacting the surface of the object 1202. In this regard, a first data value of may be represented by impacting the surface of the object 1202 (resulting in an indented, recessed surface at the data point) and a second data value may be represented by not impacting the surface of the object 1202 (resulting in the surface remaining the same at the data point).

The illustrated representation of the direct part marking indicia 1204 may be captured when illuminated by one or more illuminations projected by an alternative illuminator assembly. For example, the field of view may be illuminated by a dark-field illumination projected by the alternative illuminator assembly at a high illumination angle with respect to the direct part marking indicia 1204. In doing so, the data points of the direct part marking indicia 1204 may be illuminated to enhance the contrast between the impacted data points and the non-impacted data points, such that the contrast between the different values is represented in the captured image data object sufficiently for detecting and/or decoding the direct part marking indicia 1204. For example, in at least one embodiment, the angle of incidence for a dark-field illumination produced by an alternative illuminator assembly illuminates the direct part marking indicia 1204 such that the impacted data points remain dark spots (e.g., unilluminated due to the indentation), such that a representation may be captured including such impacted data points as dark spots for distinguishing between the various data points.

In at least one other context, for example in a circumstance where the direct part marking indicia 1204 is illuminated at an illumination angle equal to and/or near equal to the normal axis of one or more image sensor(s) for capturing the depicted representation of the direct part marking indicia 1204, the monochromatic surface may be illuminated such that each data value is indistinguishable. In this regard, the captured image data object may including a representation of the direct part marking indicia 1204 that may not be successfully detectable and/or decodable due to the monochromatic nature of the surface of the object 1202 and each individual data value of the direct part marking indicia 1204. As such, the high incidence dark-field illumination projected by the alternative illuminator assembly improves the ability for the imaging engine to capture one or more image data object(s) including a representation of the direct part marking indicia 1204 that may be successfully detected and/or decoded therefrom.

CONCLUSION

It should be appreciated that the example implementations described herein are each non-limiting examples of various embodiments of the present disclosure. In this regard, one or more enhancements implemented in the various embodiments may be provided in any combination. Additionally or alternatively, in some embodiments, one or more components may be provided with modifications as described herein. For example, in some examples, one or more components described herein may be implemented with some or all subcomponents therein mirrored, for example such that an alternative illuminator assembly is designed for rotation counter-clockwise to cause a second illumination to be projected at an angle in line with a field of view to be captured by one or more associated components.

Additionally or alternatively, in some embodiments, it should be appreciated that similar designs may be implemented to produce an increased and/or decreased number of illuminations. For example, in some embodiments, an alternative illuminator assembly may include subcomponents only for projecting a bounce flash illumination or a dark-field illumination, as described herein. Similarly, one or more additional illuminators may be included together with corresponding projection optics in a circumstance where space allows for such components.

The embodiments disclosed have been described with certain example configurations and/or implementation details. It should be appreciated that in other embodiments, for example, components may be embodied by other materials known in the art for creating such components, and/or using structurally equivalent materials. Further, it should be appreciated that embodiments may include any number of known structural elements, and/or utilize any number of known methodologies, for securing the components and/or subcomponents thereof within each assembly and/or apparatus without deviating from the scope and spirit of the disclosure.

Further, while this specification contains many specific implementation details, these should not be construed as limitations on the scope and spirit of the disclosure herein, or of what may be claimed. Rather, such implementation details provide description of features specific to particular embodiments of particular disclosures. Certain features that are described herein in the context of separate embodiments can be implemented in combination in a single embodiment. Conversely, various features that are described herein in the context of a single embodiment can also be implemented in multiple embodiments separately or in any suitable subcombination thereof. Moreover, although features may be described above as acting in certain combinations, and/or even initially claimed as such, one or more features from a claimed combination can in some cases be excised from the combination such that a claimed combination may be directed to a subcombination and/or variation of the combination and/or a subcombination thereof.

What is claimed is:

1. A mobile apparatus comprising:
an apparatus chassis for the mobile apparatus;
an imaging engine, the imaging engine comprising at least image capture optics and at least one image sensor, wherein the imaging engine is positioned within the apparatus chassis; and
an alternative illuminator assembly producing a first illumination at a first illumination angle directed in a first direction towards the imagine engine in an orientation of the mobile apparatus and a second illumination at a second illumination angle directed in a downward direction in the orientation, the alternative illuminator assembly positioned within the apparatus chassis.

2. The mobile apparatus according to claim 1, wherein the alternative illuminator assembly further comprises:
a first support component that fixedly position the imaging engine within the apparatus chassis, and a second support component that fixedly position the alternative illuminator assembly within the apparatus chassis.

3. The mobile apparatus according to claim 1, wherein the alternative illuminator assembly comprises:
an illuminator lens surface comprising at least a first reflector and a first illumination lens, and a second reflector and a second illumination lens, wherein the illuminator lens surface comprises a first assembly securing opening;
an illuminator component board comprising at least a first alternative illuminator source aligned with the first reflector and the first illumination lens, and comprising at least a second alternative illuminator source aligned with the second reflector and the second illumination lens,
wherein the illuminator component board further comprises a second assembly securing opening;
a heat sink positioned adjacent to disperse heat from the illuminator component board, wherein the heat sink comprises a third assembly securing opening; and
an assembly securing component engaged with the first assembly securing opening, the second assembly securing opening, and the third assembly securing opening, to secure the illuminator lens surface, illuminator component board, and heat sink, wherein the first illuminator source, the first reflector, and the first illumination lens produces an illumination at a first illumination angle and wherein the second illuminator source, the second reflector, and the second illumination lens produce a second illumination at a second illumination angle, wherein the first illumination angle is greater than the second illumination angle.

4. The mobile apparatus according to claim 3, wherein the heat sink is of a predefined shape, the heat sink engaging the assembly securing component to align the first alternative illuminator source with the first reflector and align the second alternative illuminator source with the second reflector.

5. The mobile apparatus according to claim 1, the mobile apparatus further comprising:
at least one processor configured to activate the alternative illuminator assembly and the imaging engine.

6. The mobile apparatus according to claim 5, wherein to activate the alternative illuminator assembly the mobile apparatus is configured to activate a first alternative illuminator source of the alternative illuminator assembly, a second alternative illuminator source of the alternative illuminator assembly, or a combination of the first alternative illuminator source and the second alternative illuminator source, and wherein to activate the imaging engine the mobile apparatus is configured to activate the at least one image sensor of the imaging engine, at least one additional illuminator source of the imaging engine, or a combination of the at least one image sensor of the imaging engine and the at least one additional illuminator source of the imaging engine.

7. The mobile apparatus according to claim 5, wherein to activate the imaging engine the mobile apparatus is configured to alternate activation of a first illuminator source of the imaging engine and a second illuminator source of the imaging engine.

8. The mobile apparatus according to claim 1, wherein the apparatus chassis comprises a height of less than 7 millimeters.

9. The mobile apparatus according to claim 1, wherein the imaging engine and the alternative illuminator assembly are oriented along a terminal edge of the apparatus chassis.

10. The mobile apparatus according to claim 1, wherein the first illumination comprises a uniform bounce flash illumination that enables reading of a highly reflective direct part marking indicia utilizing the imaging engine.

11. The mobile apparatus according to claim 1, wherein the second illumination comprises a dark-field illumination that enables reading of one or more from the group of a textured direct part marking indicia, a low contrast direct part marking indicia, and a non-contrast direct part marking indicia utilizing the imaging engine.

12. The mobile apparatus according to claim 1, wherein the mobile apparatus is configured to produce a plurality of illuminations to enable reading of a plurality of direct part marking indicia types utilizing the imaging engine.

13. A mobile apparatus comprising:
an alternative illuminator assembly comprising:
an illuminator lens surface comprising at least a first reflector and a first illumination lens, and a second reflector and a second illumination lens, wherein the illuminator lens surface comprises a first assembly securing opening;

an illuminator component board comprising at least a first illuminator source aligned with the first reflector and the first illumination lens, and comprising at least a second illuminator source aligned with the second reflector and the second illumination lens, wherein the illuminator component board further comprises a second assembly securing opening;

a heat sink positioned adjacent to disperse heat from the illuminator component board, wherein the heat sink comprises a third assembly securing opening; and an assembly securing component engaged with the first assembly securing opening, the second assembly securing opening, and the third assembly securing opening, to secure the illuminator lens surface, the illuminator component board, and the heat sink.

14. The mobile apparatus according to claim 13, wherein the first illuminator source comprises a first light emitting diode, and wherein the second illuminator source comprises a second light emitting diode.

15. The mobile apparatus according to claim 13, wherein the illuminator component board comprises a printed circuit board.

16. The mobile apparatus according to claim 13, wherein the assembly securing component comprises an assembly securing screw.

17. The mobile apparatus according to claim 13, wherein the first illuminator source is aligned with the first reflector and the first illumination lens to produce a first illumination at a first illumination angle, and wherein the second illuminator source is aligned with the second reflector and the second illumination lens to produce a second illumination at a second illumination angle.

18. The mobile apparatus according to claim 17, wherein the first illumination angle is greater than the second illumination angle.

19. A method comprising:
producing, utilizing an alternative illuminator assembly of an apparatus, a first illumination that illuminates a direct part marking indicia, wherein the first illumination is produced at a first illumination angle directed in a first direction towards an imaging engine of the apparatus in an orientation;

producing a second illumination at a second illumination angle directed in a downward direction in the orientation;

capturing, utilizing an imaging engine of the apparatus, a representation of the direct part marking indicia; and reading the representation of the direct part marking indicia.

20. The method according to claim 19, wherein the alternative illuminator assembly is located at a first position along a terminal edge of the apparatus, and the imaging engine is located at a second position along the terminal edge of the apparatus.

* * * * *